US012584815B2

(12) United States Patent
Rapin et al.

(10) Patent No.: US 12,584,815 B2
(45) Date of Patent: Mar. 24, 2026

(54) LEAK DETECTION OF FLUID DEVICES USING SENSOR TECHNOLOGY

(71) Applicant: Parker-Hannifin Corporation, Cleveland, OH (US)

(72) Inventors: Daniel P. Rapin, Schoolcraft, MI (US); Matthew A. Stowell, South Ogden, UT (US)

(73) Assignee: Parker-Hannifin Corporation, Cleveland, OH (US)

( * ) Notice: Subject to any disclaimer, the term of this patent is extended or adjusted under 35 U.S.C. 154(b) by 649 days.

(21) Appl. No.: 17/906,881

(22) PCT Filed: Jul. 23, 2021

(86) PCT No.: PCT/US2021/042891
§ 371 (c)(1),
(2) Date: Sep. 21, 2022

(87) PCT Pub. No.: WO2022/103455
PCT Pub. Date: May 19, 2022

(65) Prior Publication Data
US 2023/0125353 A1     Apr. 27, 2023

Related U.S. Application Data

(60) Provisional application No. 63/114,197, filed on Nov. 16, 2020.

(51) Int. Cl.
*G01M 3/16* (2006.01)

(52) U.S. Cl.
CPC .................................... *G01M 3/16* (2013.01)

(58) Field of Classification Search
CPC ........ G01M 3/16; G01M 3/165; G01M 3/045; G01M 3/243; G01M 3/04; G01M 3/025;
(Continued)

(56) References Cited

U.S. PATENT DOCUMENTS

| 4,888,989 A | 12/1989 | Homer |
| 6,016,697 A | 1/2000 | McCulloch |
| (Continued) | | |

FOREIGN PATENT DOCUMENTS

| JP | H0545246 A | 2/1993 |
| WO | 1999010714 A1 | 3/1999 |
| (Continued) | | |

OTHER PUBLICATIONS

International Search Report and Written Opinion of the International Searching Authority for corresponding International Patent Application No. PCT/US2021/042891, dated Jan. 10, 2022.

*Primary Examiner* — Brandi N Hopkins
(74) *Attorney, Agent, or Firm* — Renner, Otto, Boisselle & Sklar, LLP

(57) ABSTRACT

A fluid detection system includes a fluid detection sensor disposed at a fluid sensing portion of the system, and a reference sensor disposed at a reference sensing portion of the system. The detection sensor and the reference sensor are subject to at least one common ambient environmental condition, such that the detection sensor exhibits an electrical characteristic that is different from an electrical characteristic of the reference sensor when fluid contacts the detection sensor. The fluid sensing portion may be within an internal fluid passage of a conduit that is removably couplable to a fluid device. Alternatively or additionally, the fluid sensing portion may be disposed in a fluid flow path, such as a leak path, in a permanent structure of a fluid device. The reference sensor may be disposed in a location away from and/or intentionally divided from the fluid flow path. The system may include a warning system.

12 Claims, 12 Drawing Sheets

(58) Field of Classification Search
CPC ........ G01M 3/18; G01M 3/002; G01M 3/042;
G01M 3/3281; E03C 1/106; G01V 3/02;
G01L 19/0023; G01L 9/04; G01L
19/0645; B01J 19/127; G01F 1/44; G01F
1/662; G01F 1/66; G01F 1/363; G01F
23/2967; G01F 1/667; G01F 1/37; G01N
35/1009; G01N 27/026; G01N 33/2888;
G01N 29/343; G01N 33/48785; G01N
33/18; G01N 27/02; F16K 17/26; F16K
27/07; A61M 1/16; F04B 17/00; F04B
17/05; F04B 49/06; B41J 2/17566; B64D
37/30; F01M 11/10; B60S 5/00
USPC .......................................................... 73/40
See application file for complete search history.

(56)                   References Cited

U.S. PATENT DOCUMENTS

|               |    |         |                  |
|---------------|----|---------|------------------|
| 8,508,373     | B2 | 8/2013  | Rice             |
| 9,476,752     | B2 | 10/2016 | Vilag            |
| 9,733,116     | B2 | 8/2017  | Hoppe            |
| 9,893,008     | B2 | 2/2018  | Bonifield et al. |
| 2014/0076449  | A1 | 3/2014  | Betsinger        |
| 2015/0346017  | A1 | 12/2015 | Leport           |
| 2020/0038865  | A1 | 2/2020  | Huang            |

FOREIGN PATENT DOCUMENTS

| WO | 2020079532  | A1 | 4/2020  |
|----|-------------|----|---------|
| WO | 2020/206276 | A1 | 10/2020 |

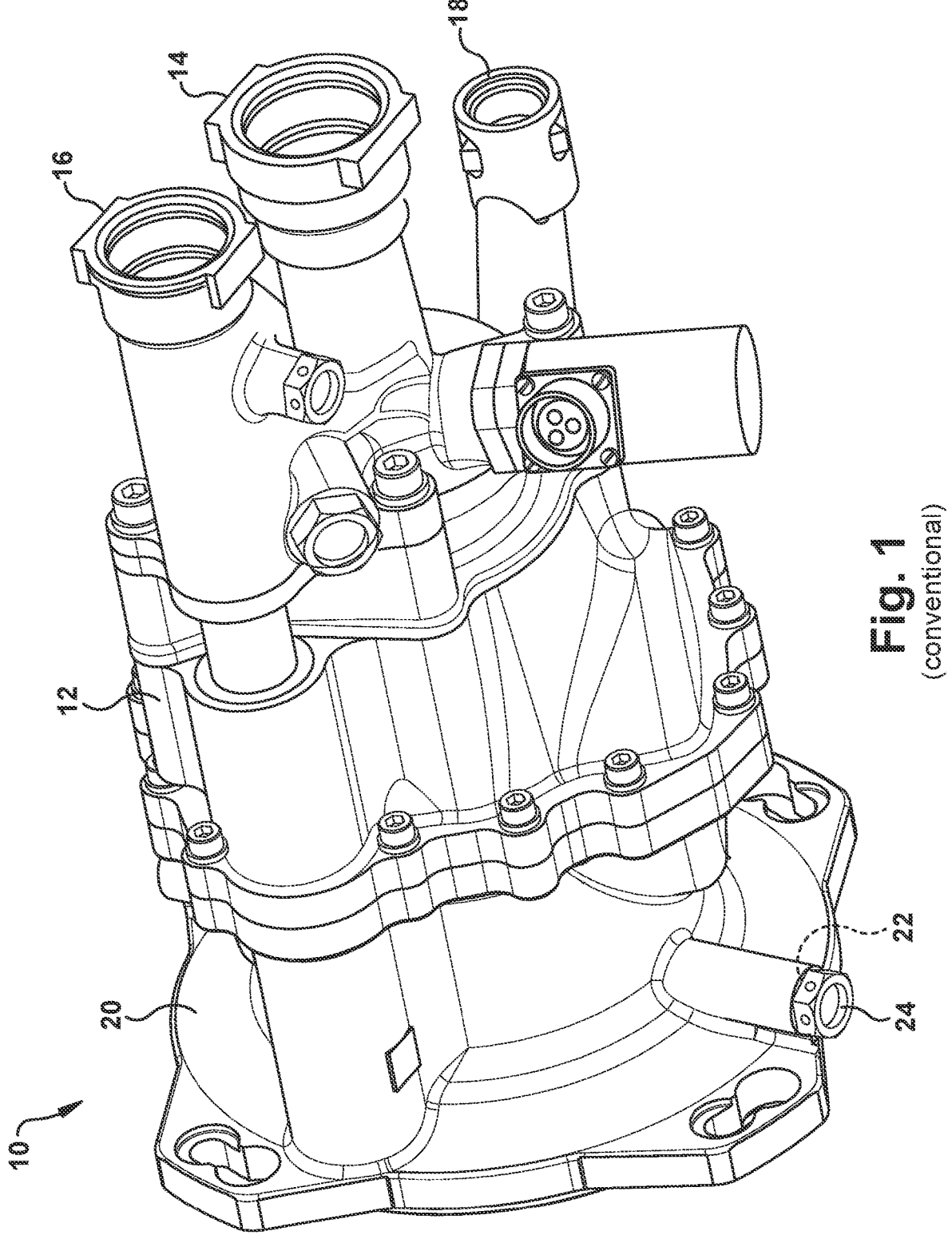
Fig. 1
(conventional)

LEAK DETECTION OF FLUID DEVICES USING SENSOR TECHNOLOGY

RELATED APPLICATIONS

This application is a national phase of International Application No. PCT/US2021/042891 filed Jul. 23, 2021, which claims the benefit of U.S. Provisional Application No. 63/114,197 filed Nov. 16, 2020, each of which is hereby incorporated herein by reference in its entirety.

TECHNICAL FIELD

This disclosure relates to fluid sensing technology, for example, fluid sensing technology for leak detection of devices on aircraft.

BACKGROUND

Pumps are utilized to transfer working fluids in a variety of applications, including hydraulic motion control in aerospace applications. An ongoing concern with such pumps is fluid leakage, which may occur over the service life of the pump. Technology used to prevent pump leakage includes spring-energized mechanical seals, magnetic seals, and lip seals. Presently, external leakage on aircraft devices is monitored through periodic visual inspection, which is a time-consuming process that may increase the downtime of the aircraft.

SUMMARY

An aspect of the present disclosure provides fluid sensing technology that enables the ability to detect and/or continuously monitor for leakage of a fluid device.

The fluid device may be an aircraft device, and the fluid sensing technology can facilitate or eliminate the human element of inspecting such device.

The fluid sensing technology may provide prognostic information, which could be communicated in real-time, thereby enabling operators to plan for maintenance and improve reliability.

According to an aspect of the present disclosure, a fluid detection system includes: a fluid conduit having an internal portion and an external portion; a detection sensor disposed at the internal portion; a reference sensor disposed at the external portion; wherein the detection sensor and reference sensor are subject to at least one common ambient environmental condition, such that the detection sensor exhibits an electrical characteristic that is different from an electrical characteristic of the reference sensor when fluid contacts the detection sensor.

According to another aspect of the present disclosure, a fluid device that performs a fluid-operated function includes: a body portion that forms a flow path through which fluid flows during normal operating conditions of the device; a leak path relative to the body portion in which leakage fluid flows outside of the flow path; a leak detection system comprising: a fluid detection sensor disposed in the leak path; a reference sensor disposed at a reference location relative to the fluid detection sensor; and circuitry configured to: receive respective electrical outputs from the detection sensor and the reference sensor; measure and/or compare the respective electrical outputs, and communicate information derived from the measurement and/or comparison of the respective electrical outputs to indicate when leakage fluid is detected at the fluid detection sensor.

According to another aspect, an aircraft system includes: a fluid circuit; a fluid device in the fluid circuit configured to convey or receive fluid for performing an aircraft function; and the fluid or leak detection system according to any of the foregoing.

According to another aspect, an aircraft includes the aircraft system according to the foregoing, wherein the fluid or leak detection system is arranged with the detection sensor disposed in a leak path of the fluid device; and further including an aircraft warning system or prognostic system for the fluid device, in which the warning system or prognostic system operatively receives information from the fluid detection system for indicating fluid leakage of the fluid device when fluid is detected at the detection sensor.

According to another aspect, a method of leakage detection and warning in an aircraft includes: providing a fluid detection system in a leak path of a fluid device of the aircraft, the fluid detection system including a fluid detection sensor disposed in the leak path, and a reference sensor disposed at a reference sensing portion outside of the leak path; receiving electrical outputs from the fluid detection sensor and the reference sensor; comparing the electrical outputs to determine the presence of leakage fluid at the fluid detection sensor; and outputting information corresponding to the detection of the leakage fluid at the fluid detection sensor to a warning system for providing an alert.

According to another aspect, a capacitive fluid detection sensor includes a polymer base layer; a plurality of electrically conductive traces overlying the polymer base layer; and a ground layer underlying the polymer base layer; wherein the plurality of electrically conducive traces includes a first set of traces extending parallel to each other and being laterally spaced apart, and a second set of traces extending parallel to each other and to the first set of traces, the second set of traces being interlaced among the first set of traces, and the second set of traces being electrically coupled to the ground layer via respective electrically conductive interconnects, and wherein the plurality of electrically conductive traces form a capacitive sensing portion of the capacitive fluid detection sensor.

The following description and the annexed drawings set forth certain illustrative embodiments of the invention. These embodiments are indicative, however, of but a few of the various ways in which the principles of the invention may be employed. Other objects, advantages and novel features according to aspects of the invention will become apparent from the following detailed description when considered in conjunction with the drawings.

BRIEF DESCRIPTION OF THE DRAWINGS

The annexed drawings, which are not necessarily to scale, show various aspects of the invention.

FIG. 1 is a perspective view showing a conventional engine driven pump for an aircraft system.

DETAILED DESCRIPTION

Figure 2:
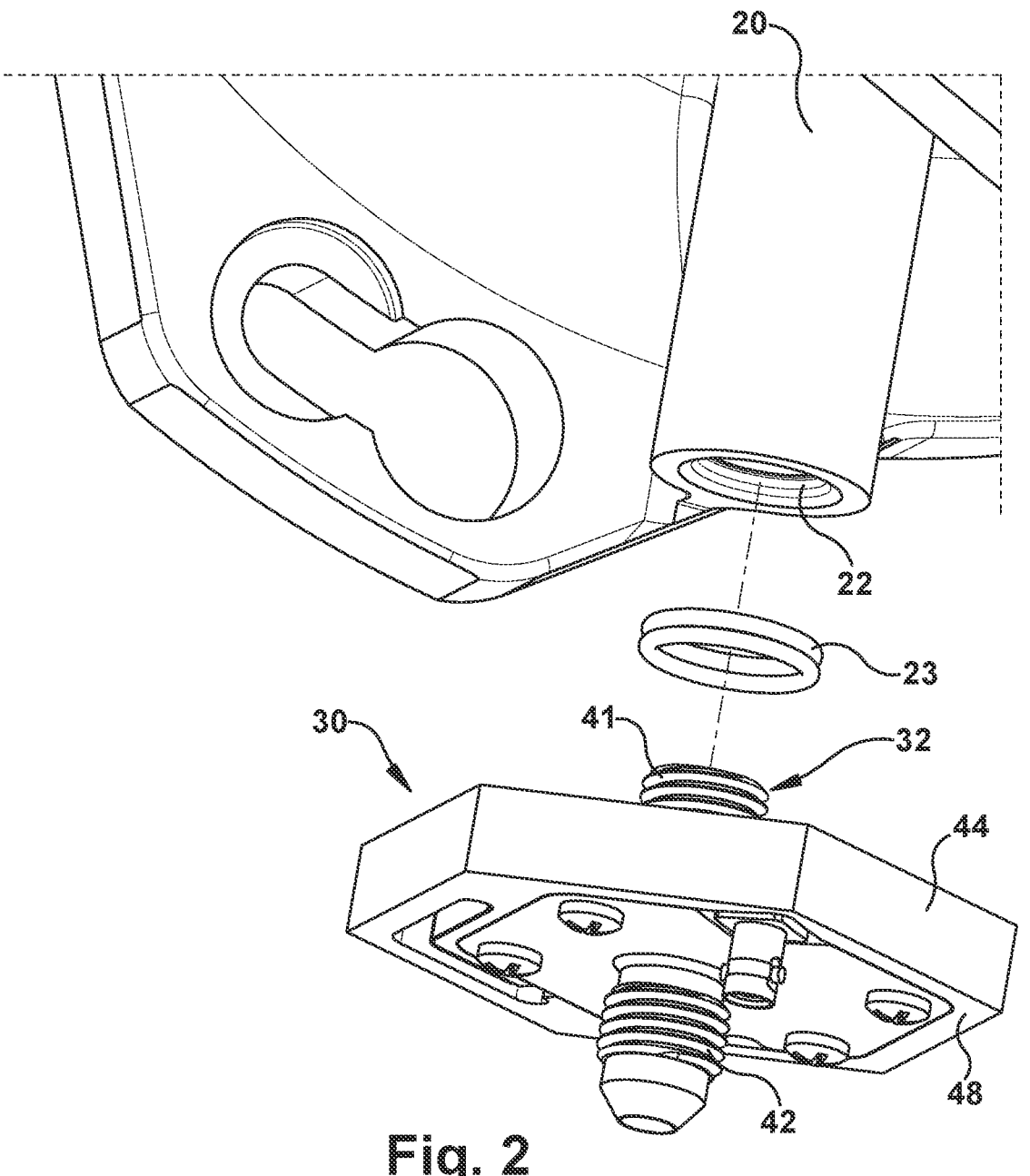
FIG. 2 is a perspective exploded view showing an exemplary fluid detection system according to an embodiment of the present disclosure coupling to the engine driven pump in FIG. 1.

The principles and aspects according to the present disclosure have particular application to fluid devices for aircraft systems, and thus will be described below chiefly in this context. It is understood, however, that the principles and aspects according to the present disclosure may be applicable to other applications and/or other fluid-related systems or devices, such as pumps, valves, motors, or other fluid-operated consumers, and the like.

According to an aspect of the present disclosure, an exemplary fluid detection system, such as for leak detection, includes a fluid detection sensor disposed at a fluid sensing portion of the system, and a reference sensor disposed at a reference sensing portion of the system. The fluid detection sensor and the reference sensor are subject to at least one common ambient environmental condition, such that the fluid detection sensor exhibits an electrical characteristic that is different from an electrical characteristic of the reference sensor when fluid contacts the fluid detection sensor.

In exemplary embodiments, the fluid sensing portion of the system is located within a fluid flow path for enabling detection when fluid contacts the detection sensor, and the reference sensing portion having the reference sensor is outside of the fluid flow path. The fluid flow path may be formed by a part of a fluid device, such as a permanent structure of the device; or may be formed by a removably mountable fitting, conduit, adapter, or the like, which is operatively coupled to the fluid device. The fluid device may be any suitable device that conveys fluid, in particular liquids, such as a pump, a valve, a motor, an actuator, or some other fluid-operated consumer, or the like. The fluid flow path may be a leakage path or drain path of the device that is not intended for fluid flow during ideal (normal) operation of the device.

The fluid device may be an aircraft component, in which routine maintenance and inspection typically is performed. In exemplary embodiments, the fluid flow path is formed by a fluid conduit having an internal portion within which the detection sensor is disposed, and wherein the reference sensor is disposed outside of the internal portion. Such a fluid conduit may be at least partially formed by a fluid coupling, connector, or other suitable fitting that is adapted for fluidly connecting parts of a fluid system. For example, the fluid fitting having the detection sensor and the reference sensor may be a union fitting within a port of the fluid device, such as within a drain port or leak port of an aircraft pump device.

Referring to FIG. 1, a conventional engine driven hydraulic pump 10 for an aircraft is shown. The hydraulic pump 10 includes a pump housing 12 having an input port 14, an output port 16, and a case pressure port 18. The hydraulic pump 10 also includes a mounting flange 20 having a shaft seal (hidden from view) for operably mounting to a turbine engine, or turbine engine gearbox, of the aircraft. As is well-known in the art, the engine driven pump 10 is driven by an output shaft of the turbine engine or turbine engine gearbox (e.g., accessory gearbox) to drive the pump 10 during normal operation of the aircraft. Alternatively, the pump 10 can be configured to be driven in any other suitable manner, such as driven by an electric motor on the aircraft, for example. In an aircraft application, the pump 10 provides hydraulic fluid to fluid-operated consumers, such as hydraulic motors, actuators or the like, that operate aircraft components, such as flaps, landing gear, steering, or the like. As shown in the illustrated embodiment, a drain port 22 is provided in the mounting flange 20 which allows shaft seal leakage fluid to drain to atmosphere (e.g., overboard the aircraft). In a conventional engine driven hydraulic pump 10, as shown, the drain port 22 may include a drain port plug 24, or other suitable fluid fitting.

Turning to FIGS. 2-8, an exemplary fluid detection system 30 according to an embodiment of the present disclosure is shown. FIG. 2 depicts the fluid detection system 30 being retrofitted into the conventional pump 10 in FIG. 1. In the illustrated embodiment, the fluid detection system 30 is incorporated into a fluid conduit 32, such as a union fitting, for coupling to the drain port 22 along with a seal 23.

Figures 6, 7, 8:
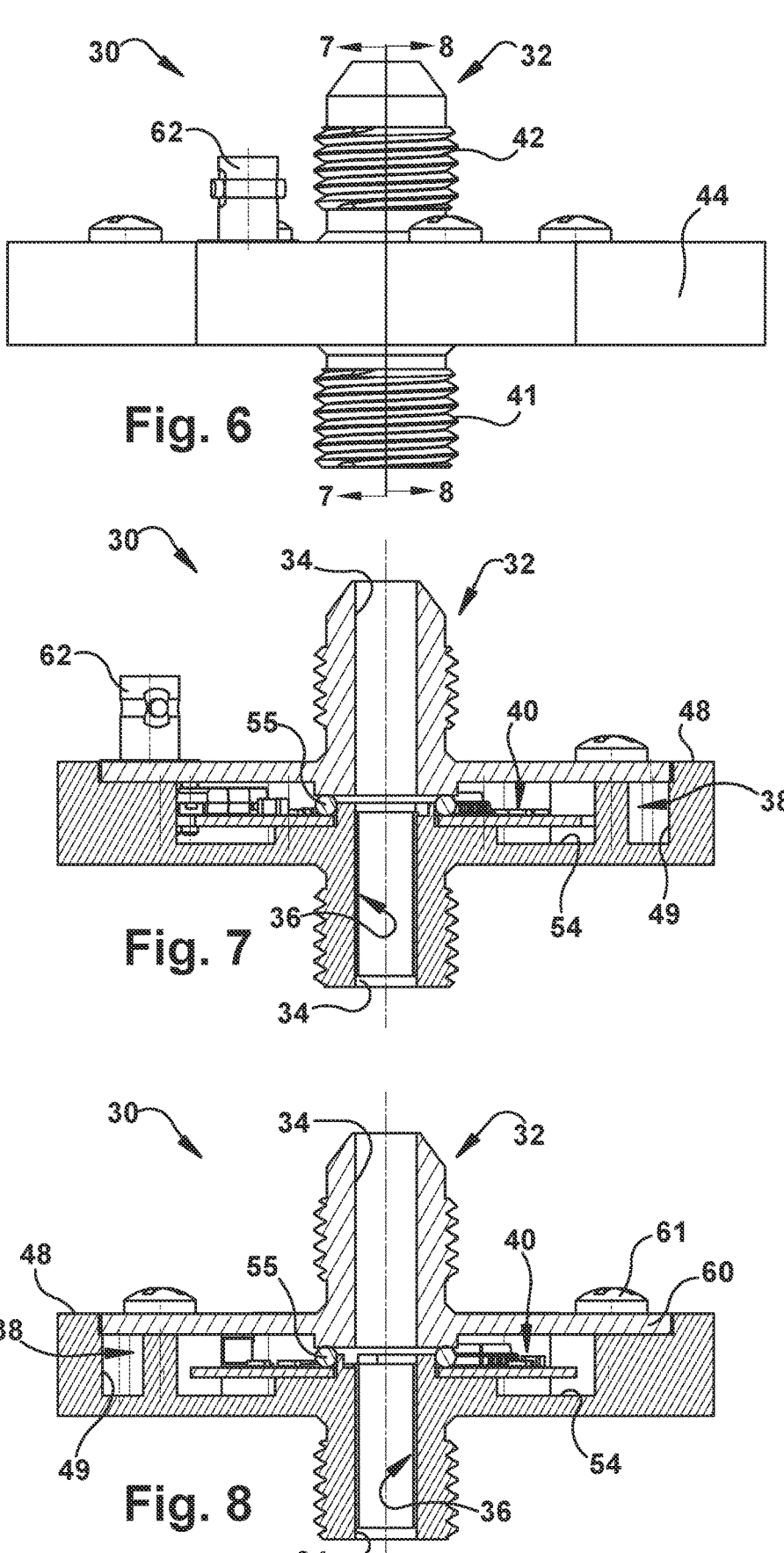
FIG. 6 is a side view of the fluid detection system in FIG. 3.
FIG. 7 is a cross-sectional side view of the fluid detection system taken about the line 7-7 in FIG. 6.
FIG. 8 is a cross-sectional side view of the fluid detection system taken about the line 8-8 in FIG. 6.

The fluid conduit 32 includes an internal portion forming a fluid passage 34 (as depicted in FIGS. 7 and 8, for example) which is in fluid communication with an internal chamber of the mounting flange 20 via the drain port 22. A fluid detection sensor 36 of the fluid detection system 30 is disposed within the internal passage 34 of the fluid conduit 32 for detecting fluid within the passage (also depicted in FIGS. 7 and 8, for example). A reference sensor 38 of the fluid detection system 30 is disposed at an external portion of the fluid conduit 32. Because the fluid detection sensor 36 and the reference sensor 38 are both disposed on the fluid conduit 32 in the illustrate embodiment, they are both subject to at least one common ambient environmental condition, such as temperature, pressure, humidity, and/or the like. As discussed in further detail below, both the reference sensor 38 and the fluid detection sensor 36 are operatively coupled to one or more suitable circuits (e.g., circuitry 40), or electronics, that are configured to receive electrical outputs from the respective sensors 36, 38 and compare the outputs to determine whether fluid is detected at the fluid detection sensor 36.

The fluid conduit 32 may be any suitable conduit, which in the illustrated embodiment is constructed as fitting (also referred to with 32). The fitting 32 may be any suitable fitting, such as a threaded fitting, a barbed fitting, a plug, or the like. In the illustrated embodiment, the fitting 32 is a threaded fitting having a first end 41 configured to threadedly couple to the drain port 22 of the pump 10, and a second opposite end 42 configured to threadedly couple to a drain line, such as another conduit (e.g., tube). The conduit 32 (e.g., fitting) includes a main body portion 44 between the opposite first and second ends 41, 42 which may be used to apply torque. As shown, the main body portion 44 may be formed in a hexagonal shape for being torqued by a wrench, for example.

The fluid detection sensor 36 may be any suitable sensor for detecting the presence of fluid at the detection location, which is in the internal fluid passage 34 of the conduit 32 in the illustrated embodiment. The fluid detection sensor 36 may be located at any position within the fluid passage 34. In exemplary embodiments, the fluid detection sensor 36 includes a flexible circuit board that is capable of being rolled and placed in close proximity to the internal surface of the conduit 32 forming the passage 34. To secure the fluid detection sensor 36, the detection sensor may be attached to the internal surface of the conduit 32 such as with a suitable adhesive. Close contact with the conduit 32 may better ensure that the fluid detection sensor 36 is subject to common ambient environmental condition(s) as the reference sensor 38. A sensing portion 46 (FIG. 10A) of the fluid detection sensor 36 faces radially inward of the passage 34 so that fluid flowing through the passage will contact the sensing portion 46. In the illustrated embodiment, the width of the fluid detection sensor 36, and more particularly the sensing portion 46, is equal to the circumference of the inner diameter of the internal passage 34 so that the fluid detection sensor 36 fully encompasses the fluid passage 34. This ensures that any fluid passing through the passage 34 will pass over the fluid detection sensor 36 and be detected. In exemplary embodiments, the fluid detection sensor 36 is a capacitive sensor for detecting the presence of fluid, as discussed in further detail below.

The reference sensor 38 may be any suitable sensor for sensing the reference (e.g., ambient) environment at the reference location, which in the illustrated embodiment is external to the fluid passage 34 of the conduit 32. In exemplary embodiments, the reference sensor 38 is located at a position that is unlikely and/or purposefully restricted from exposure to fluid, such as under a covering, within a recess, pocket, and/or the like, for giving a reading of the common ambient environmental condition in the absence of fluid. In the illustrated embodiment, for example, the reference location is on an underside face 48 of the conduit main body portion 44 within a recess 49 in the underside face 48. As shown, the recess 49 may be radially spaced from the radially outer peripheral edge of the main body 44. In this manner, any leakage that may occur external to the fluid conduit 32 may drip off the edge of the main body 44 and will not contact the reference sensor 38 within the recess 49. In exemplary embodiments, the reference sensor 38 includes a flexible circuit board that is capable of being conformed and attached to a surface of the conduit 32. For example, the reference sensor 38 may be attached to a surface within the recess 49 with a suitable adhesive. A sensing portion 50 (FIG. 9A) of the reference sensor 38 faces outwardly for exposure to the environmental condition (e.g., atmosphere) at the reference location. In exemplary embodiments, the reference sensor 38 is the same type as the fluid detection sensor 36, such as a capacitive sensor, for example.

Because the reference sensor 38 is subject to common ambient environmental condition(s) (e.g., temperature, pressure, humidity, etc.) as the fluid detection sensor 36, both sensors 36, 38 will exhibit the same electrical characteristic and have the same electrical output when neither sensor 36, 38 is in contact with fluid. The electrical characteristic may be any suitable electrical characteristic responsive to the presence of fluid and that is capable of enabling transmission of the electrical output. For example, the electrical characteristic of the respective sensors 36, 38 may be a capacitance that changes in response to the presence of fluid at the respective sensing portions 46, 50 of the sensors 36, 38. The electrical outputs may be any suitable outputs for use in measurement and/or comparison between the sensors 36, 38, such as an electrical current, voltage, signal, or the like.

Figure 12:
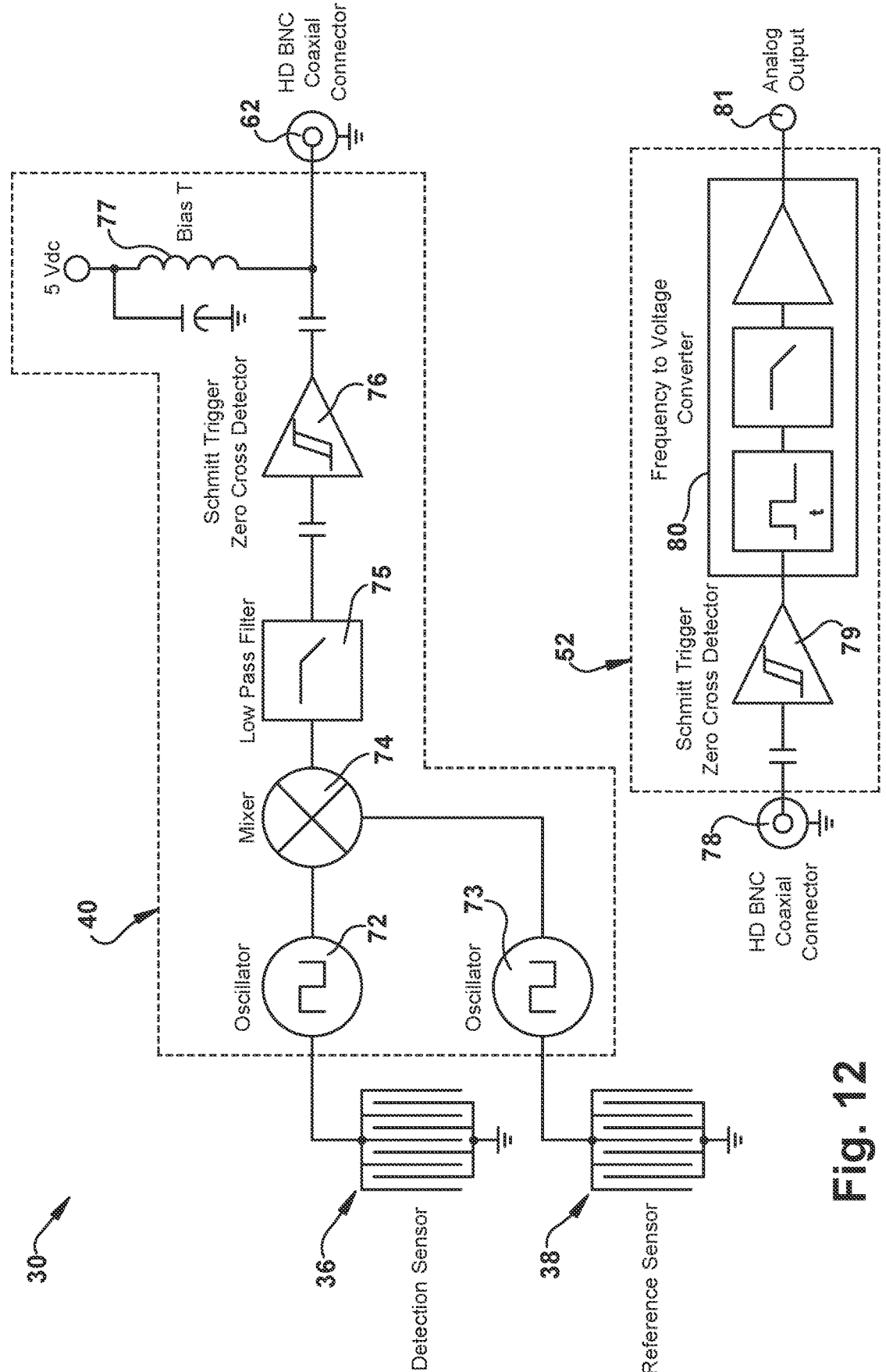
FIG. 12 is an exemplary functional block diagram of the fluid detection system showing exemplary measurement circuitry operatively coupled to a reference sensor and a detection sensor according to an embodiment, and showing exemplary receiver circuitry for receiving outputs from the measurement circuitry.

As discussed in further detail below, when fluid contacts the sensing portion 46 of the fluid detection sensor 36 and when fluid is not in contact with the sensing portion 50 of the reference sensor 38, the respective sensors 36, 38 will exhibit different electrical characteristics (e.g., capacitances) that are measured and/or compared to each other via the circuitry 40 (i.e., measurement circuitry 40), which may include one or more suitable circuits, electrical components, electronics, processor(s) (e.g., microprocessor), or the like. In exemplary embodiments, the measurement circuitry 40 receives the electrical outputs from the respective sensors 36 and 38, makes a differential measurement of the electrical outputs, may subtract off any common mode influences on the sensors 36 and 38, and outputs information derived from the sensors 36, 38, such as in the form of a current, voltage, or signal. Based on the outputted information from the measurement circuitry 40, detection of fluid at the fluid detection sensor 36 may be communicated to a suitable receiver 52 (as shown in FIG. 12, for example). Such detection and transmission of information for indication may occur when fluid is detected at the fluid detection sensor 36, such as when a threshold limit is exceeded, for example, indicating the presence of fluid, or a certain amount of fluid, such as drops of fluid per minute, or a complete saturation of the sensor with fluid, for example.

Referring particularly to FIGS. 4-8, the exemplary circuitry 40 of the fluid detection system 30 is shown in further detail. In the illustrated embodiment, the circuitry 40 includes the measurement circuitry (also referenced with 40) that is configured to receive the electrical outputs from the fluid detection sensor 36 and the reference sensor 38, and is configured to make the measurements, comparisons, and/or computations for determining the detection of fluid. As shown, the circuitry 40 may be contained within a casing formed at least partially by a recess 54 in the main body portion 44 of the fluid conduit 32. In the illustrated embodiment, for example, the recess 54 surrounds the internal flow passage 34. The circuitry 40 is disposed within the recess 54 and may be secured therewithin with a potting compound, such as an epoxy. The circuitry 40 includes an opening that surrounds the internal fluid passage 34, and a seal 55 may be included to fluidly seal the passage 34 from the circuitry 40.

The fluid detection sensor 36 includes an electrical contact portion 56, such as a bendable metal tab, that operatively couples the fluid detection sensor 36 to a corresponding contact 57 of the circuitry 40. As shown in the illustrated embodiment, the contact portion 56 of the fluid detection sensor 36 extends under the seal 55 to make contact with the circuitry contact 57. The reference sensor 38 also includes an electrical contact portion 58, such as a bendable metal tab, that operatively couples the reference sensor 38 to a corresponding contact 59 of the circuitry 40. As shown, the contact portion 58 of the reference sensor 38 extends out of the recess 49 to contact the circuitry 40.

The casing containing the circuitry 40 includes a cover 60 that is secured to the main body portion 44 via suitable fasteners 61, such as bolts or screws, for covering and encasing the circuitry 40. As shown, an externally addressable communications connector 62, or port, may be provided which extends through the cover 60 and is operatively coupled to the circuitry 40 for communicating information corresponding with the detection of fluid at the fluid detection sensor 36, or absence thereof.

Figures 9A, 9B, 10A, 10B:
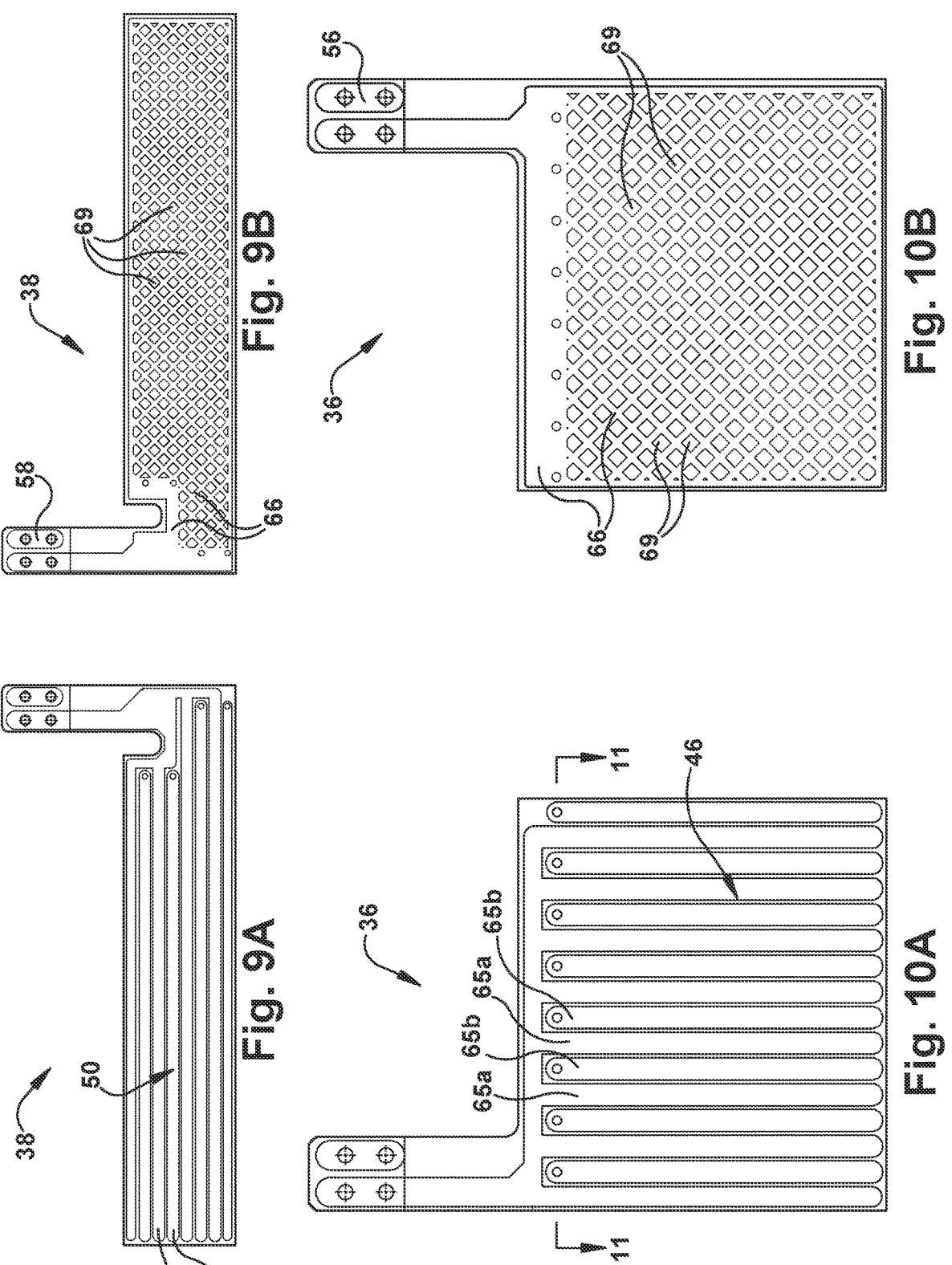
FIG. 9A is a top plan view of an exemplary reference sensor used in the fluid detection system in FIG. 3.
FIG. 9B is a bottom plan view of the reference sensor in FIG. 9A.
FIG. 10A is a top plan view of an exemplary fluid detection sensor used in the fluid detection system in FIG. 3.
FIG. 10B is a bottom plan view of the detection sensor in FIG. 10A.
Figure 11:
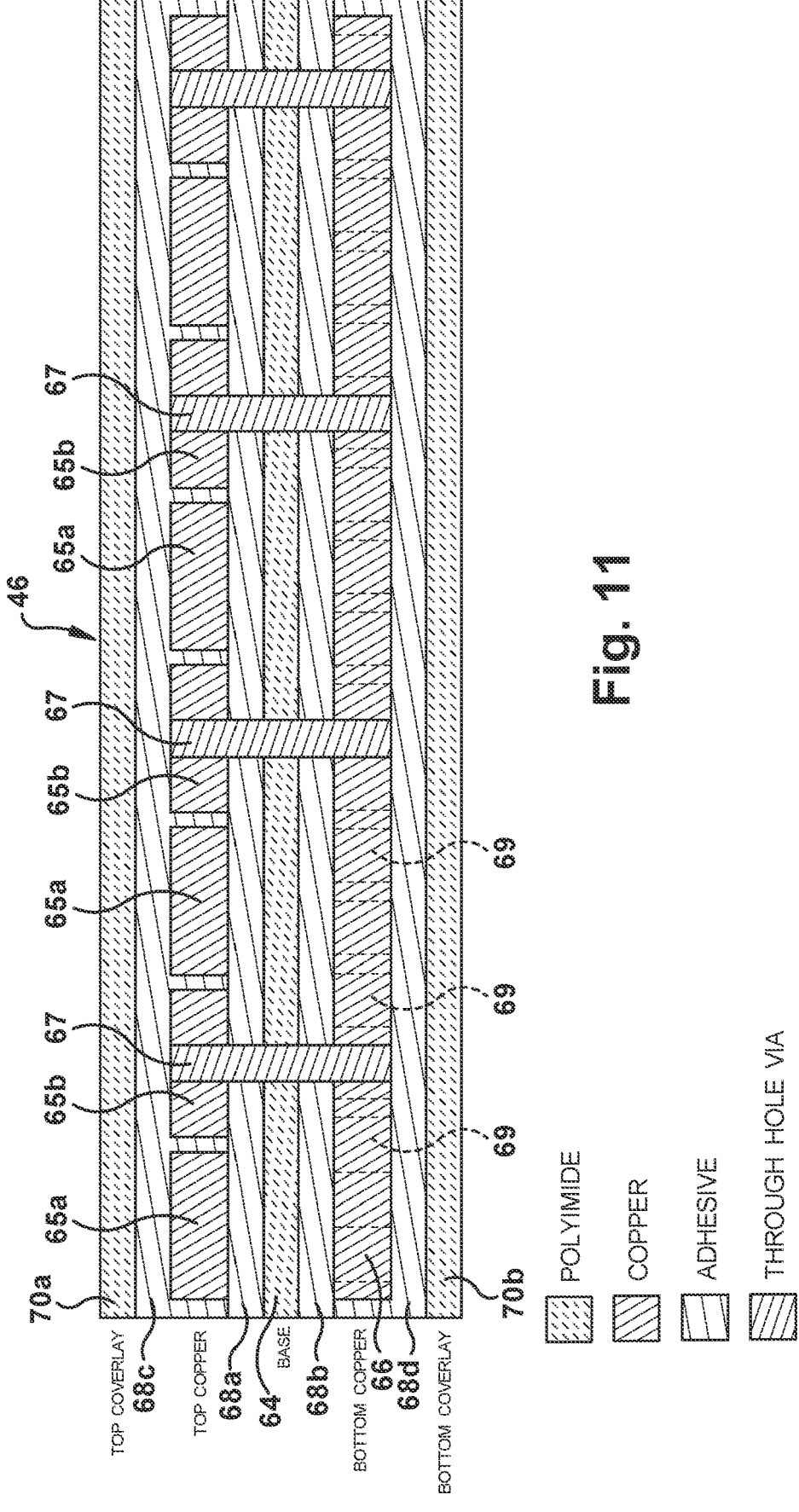
FIG. 11 is a cross-sectional side view of the detection sensor taken about the line 11-11 in FIG. 10A.

Turning to FIGS. 9A-11, exemplary embodiments of the reference sensor 38 and the fluid detection sensor 36 are shown in further detail. FIG. 9A shows a front face of the reference sensor 38 having the sensing portion 50, and FIG. 9B shows a back face of the reference sensor 38. FIG. 10A shows a front face of the fluid detection sensor 36 having the sensing portion 46, and FIG. 10B shows a back face of the fluid detection sensor 36. FIG. 11 shows a cross-sectional side view of the fluid detection sensor 36 taken about the line 11-11 in FIG. 10A. In exemplary embodiments, the reference sensor 38 and the fluid detection sensor 36 are constructed substantially the same, with the same number and type of layers. Consequently, reference may be had particularly to the fluid detection sensor 36 in the illustrated drawings and description below, and the same reference numerals will be used to refer to the same structures in the fluid detection sensor 36 and the reference sensor 38.

As discussed above, each of the sensors 36, 38 may be formed as a flexible circuit, such as a flexible capacitor. In exemplary embodiments, the sensors 36, 38 are formed with one or more polymer film layers that are flexible and can withstand the operating environment. In exemplary embodiments, the polymer film layer(s) include polyimide film layer(s) that are durable in harsh environments and will not deteriorate from permanent exposure to fluids such as oil. In the illustrated embodiment, for example, a substrate or base layer 64 of each sensor 36, 38 is formed by such a polymer (e.g., polyimide) film layer.

As shown, an upper layer of each sensor 36, 38 includes the respective sensing portion 46, 50, or sensing area, which is formed by a series of circuit traces 65, or electrodes, overlying the base or substrate layer 64. The circuit traces 65 are made with a conductive material (e.g., copper) and have a specific geometry such that they produce a capacitor. As shown, the circuit traces 65 of the capacitor include an array of sets of parallel interleaving traces. A first set of the traces 65a are electrically coupled together, and a second set of traces 65b are electrically coupled together. As shown, the second set of traces 65b are operatively coupled to a ground layer 66 (e.g., copper) by electrically conductive vertical interconnects 67, or vias, which may be made with a suitable metal (e.g. copper). The respective traces 65a, 65b (e.g., copper) overlying the base or substrate layer 64 (e.g., polyimide) may be adhered to the base layer with a suitable adhesive 68a.

The first set of traces 65a interleaved with the respective second set of traces 65b form the respective electrodes of the capacitor circuit with the spaces between respective interleaved traces 65a, 65b forming the dielectric (which may be filled by the adhesive or polyimide, for example). In this manner, the upper portions of the respective sensors 36, 38 form the respective capacitive sensing areas 46, 50. In exemplary embodiments, the fluid detection sensor 36 is disposed within the internal passage 34 of the fluid conduit

32 with the parallel sets of traces 65a, 65b extending in the direction of the longitudinal axis of the passage 34. In this manner, fluid running through the passage 34 will span across sets or pairs of traces 65a, 65b which will change the dielectric between the traces 65a, 65b, and thus the capacitance. A change in the capacitance is used to detect fluid as the fluid runs through the passage 34. The spacing between pairs of traces 65a, 65b is relatively small (e.g., about 0.005-inches) such that relatively small drips of fluid will be detected. In the illustrated embodiment, each layer of the fluid detection sensor 36 and/or reference sensor 38 may be about 0.001-inches in thickness.

The ground layer 66 toward a lower portion of each sensor circuit 36, 38 underlies the substrate (e.g., polyimide) layer 64, and may be adhered to the substrate layer 64 with a suitable adhesive layer 68b. The ground layer 66 may form a shield layer 66 that prevents external interference from influencing the sensing from the back of the sensor. The shield layer 66 does not influence the top layer, or sensing portion 46 of the fluid detection sensor 36. In this manner, only the upper or front sensing area 46 of the fluid detection sensor 36 is capable of electrically detecting fluid. In exemplary embodiments, the ground shield layer 66 includes a grid of metal, such as copper, with an array of spaces 69 forming island sections within the grid. These spaces 69 may be filled with adhesive or polyimide from processing, for example. The fill of the grid material (e.g., copper) in the ground layer 66 may be in a range from 15-35% by area, such as 25% grid space area relative to total area (grid space plus island sections).

In exemplary embodiments, the upper trace layer 65 (e.g., copper traces) and the lower ground layer 66 (e.g., copper grid) are each insulated with another polymer (e.g., polyimide) film layer (i.e., coverlays 70a and 70b) which may be adhered with further adhesive layers 68c, 68d. The encapsulation with the coverlay films 70a and 70b galvanically isolates the capacitor from the surrounding leakage fluid and union with the metal from the conduit, but still enables detection of fluid relative to the traces 65 via change in capacitance when the fluid contacts the top coverlay 70a.

Referring to FIG. 12, an exemplary functional block diagram of the measurement circuitry 40 operatively coupled to the reference sensor 38 and the fluid detection sensor 36 is shown. In the illustrated embodiment, the reference sensor 38 and the fluid detection sensor 36 are capacitive sensors. The capacitance of each sensor 36, 38 will vary based on its ambient environmental conditions, such as changes in temperature, relative humidity of surrounding atmosphere, etc. as well as the presence of fluid (e.g., hydraulic fluid). This occurs because each of the environmental factors (including the presence of fluid) have a relative permittivity associated with them. The relative permittivity of each factor, when applied to the sensor 36, 38, modifies the dielectric constant of the sensor and changes the overall capacitance of the sensor. The capacitance of each sensor 36, 38 is therefore the sum of each of these factors and their associated relative permittivity, as shown in Equation 1 below:

$$C_{sensor} = \Sigma \varepsilon_{fluid} + \varepsilon_{temp} + \varepsilon_{rel\ hum} + \ldots \qquad \text{Equation 1}$$

Figure 3:
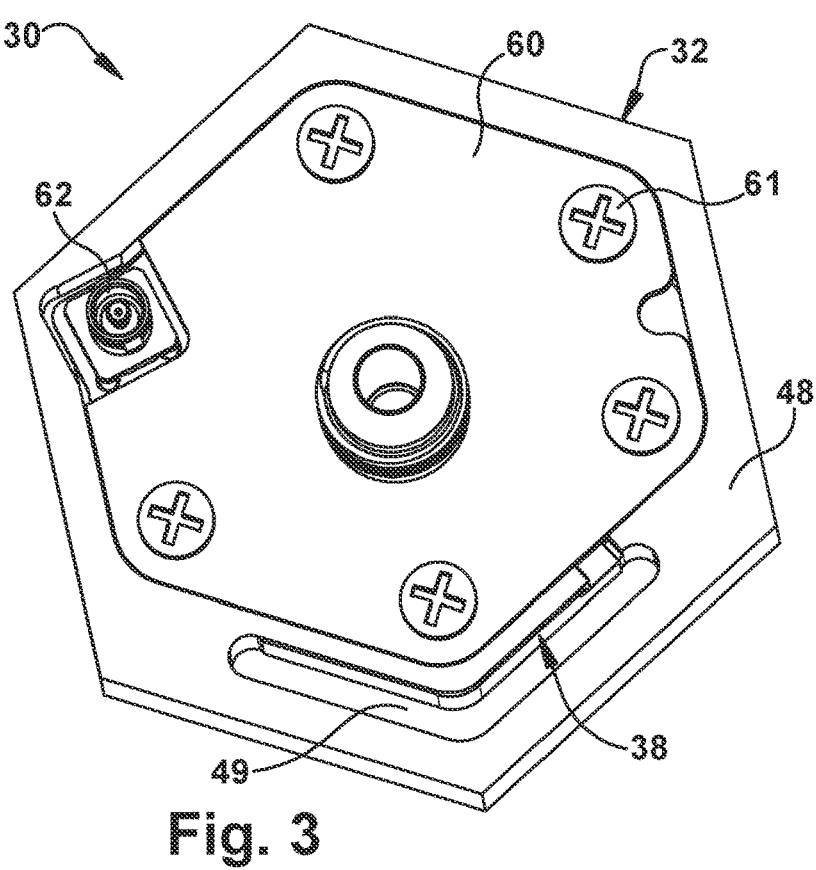
FIG. 3 is a perspective bottom view of the fluid detection system in FIG. 2.
Figure 4:
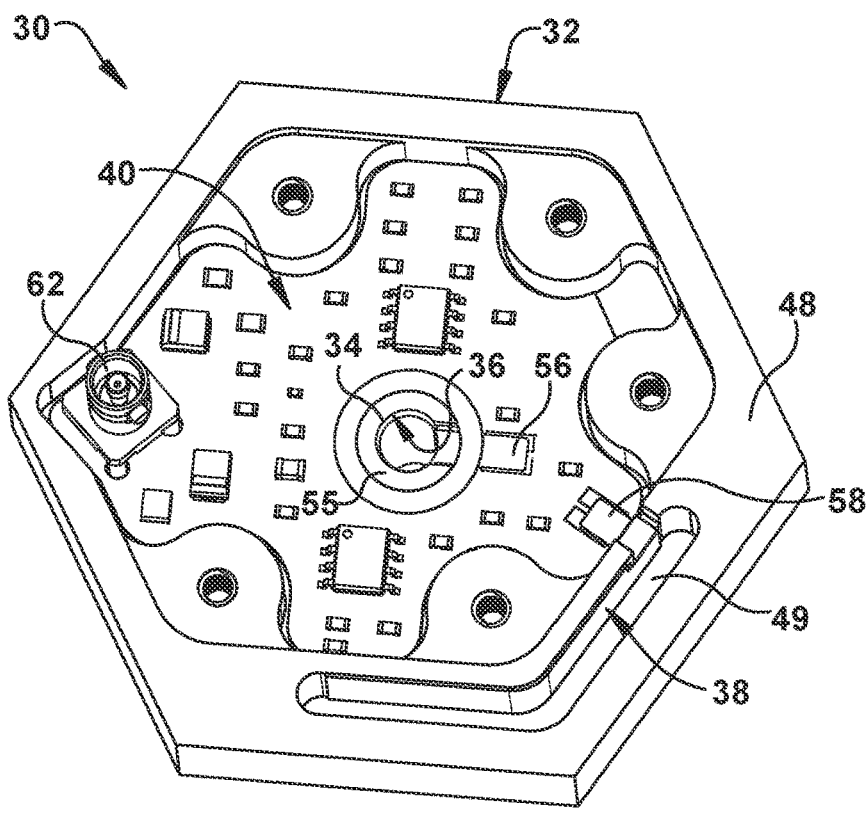
FIG. 4 is a perspective bottom view of the fluid detection system in FIG. 3 shown with an exemplary cover removed.
Figure 5:
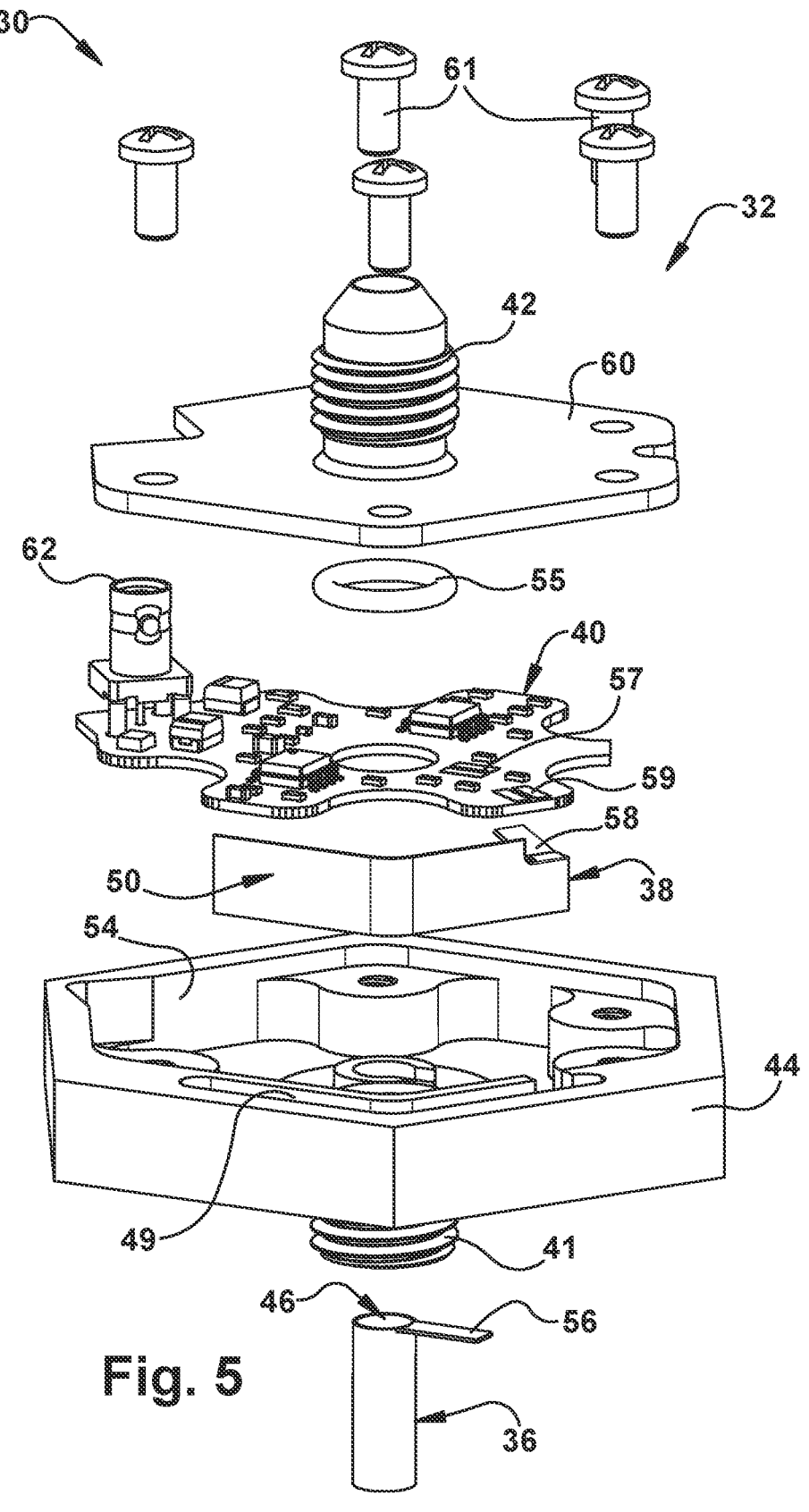
FIG. 5 is an exploded perspective view of the fluid detection system in FIG. 3.

Where:
$C_{sensor}$=Capacitance of the sensor
$\varepsilon_{fluid}$=Relative permittivity of the hydraulic fluid
$\varepsilon_{temp}$=Relative permittivity of temperature
$\varepsilon_{rel\ hum}$=Relative permittivity of relative humidity
. . . =Relative permittivity of other environmental factors As both the reference sensor 38 and the fluid detection sensor 36 are physically coupled to the fluid conduit 32 (e.g. metal body) in the illustrated embodiment, and as both sensors 36, 38 are open and exposed to atmosphere, they both will experience common ambient environmental condition(s). A common ambient environmental condition may be any suitable ambient environmental condition or combination of ambient environmental conditions, such as ambient temperature, ambient humidity, ambient pressure, and the like, in a common region around the sensors 36, 38. As such, the common ambient environmental condition may be a common atmospheric condition. A common ambient environmental condition between the sensors 36, 38 may be the same or substantially similar ambient environmental condition between the sensors 36, 38. For example, a temperature, humidity, pressure, etc. of each sensor 36, 38 within a deviation of no greater than 20% of the other sensor is considered substantially similar and thus is a common ambient environmental condition among the sensors. For example, where the reference sensor 38 and the fluid detection sensor 36 share a common body (such as the metal fluid conduit body as shown in FIG. 3), a temperature deviation between the sensors 36, 38 without fluid contacting the fluid detection sensor 36 should be negligible, such as in a range from 0° F. to 5° F. Attaching each sensor 36, 38 to a common structure (e.g., the conduit 32 or fitting body) will enhance the common temperature between the sensors, for example. Locating the sensors 36, 38 in relatively close proximity to each other, such as on the same component, will enhance the common humidity, pressure, etc. between the sensors, for example.

The various ambient environmental conditions, or factors, may be summed together as shown in Equation 2:

$$\varepsilon_{env}=\Sigma\varepsilon_{temp}+\varepsilon_{rel\ hum}+\ldots \qquad \text{Equation 2}$$

Where:

$\varepsilon_{env}$=Relative permittivity of all environmental factors $\varepsilon_{temp}$=Relative permittivity of temperature $\varepsilon_{rel\ hum}$=Relative permittivity of relative humidity . . . =Relative permittivity of other environmental factors Inasmuch as the reference sensor 38 is intended only to be exposed to ambient environmental conditions, the capacitance of the reference sensor can be expressed as Equation 3:

$$C_{ref}=\varepsilon_{env} \qquad \text{Equation 3}$$

Where:

$C_{ref}$=Capacitance of reference sensor $\varepsilon_{env}$=Relative permittivity of all environmental factors.

The fluid detection sensor 36 will experience all environmental conditions, including common ambient environmental conditions with that of the reference sensor 38, as well as fluid contacting the fluid detection sensor 36. The capacitance of the detection sensor is shown in Equation 4:

$$C_{det}=\varepsilon_{env}+\varepsilon_{fluid} \qquad \text{Equation 4}$$

Where:

$C_{det}$=Capacitance of detection sensor $\varepsilon_{env}$=Relative permittivity of all environmental factors $\varepsilon_{fluid}$=Relative permittivity of the hydraulic fluid Generally, the electrical outputs from the respective sensors 36, 38 are processed and compared to determine whether fluid is detected at the fluid detection sensor 36. This information may be output to a suitable receiver, such as a storage medium (e.g. memory), to an indicator (e.g., LED, audible signal, or the like), and/or to a computer, such as a health monitoring system, for example.

More specifically, as shown in the functional block circuit diagram of FIG. 12, the measurement circuitry 40 includes several stages. Generally, a first stage is to receive the electrical outputs of the respective sensors 36, 38. Then, the outputs are measured, compared and quantified to represent whether there is a detection of leakage fluid at the fluid detection sensor 36. The quantified value (e.g., degree and/or presence of leakage fluid at the fluid detection sensor 36) may be conveyed to one or more aircraft electronic systems, such as a pump prognostic health monitoring system, by any of several industry standard output signal such as current or voltage.

Each stage of the measurement circuitry 40 will now be described in further detail. As shown, the first stage includes processing the electrical output of the respective sensors 36, 38 by converting the electrical outputs into frequency using oscillators 72, 73 which provide an analog signal for later processing. The timing elements of the respective oscillators 72,73 are the capacitance of the corresponding detection and reference sensors 36, 38. Because the detection and reference sensors 36, 38 will provide varying values of capacitance based on their respective environmental condition (with the detection sensor being placed in a position for responding to contact with fluid), this varying capacitance is measured by the corresponding oscillator circuits 72,73 for each sensor. Thus, the measurement circuitry 40 converts the capacitance from each sensor 36, 38 into frequency values.

The output frequency of each oscillator 72, 73 is $f_{ref}$ and $f_{det}$, representing the capacitance of each sensor 36, 38 multiplied by a gain factor associated with the oscillators. This is shown in Equation 5 and Equation 6 below:

$$f_{ref}=k*C_{ref} \qquad \text{Equation 5}$$

Where:

$f_{ref}$=Frequency associated with reference sensor $C_{ref}$=Capacitance of detection sensor k=Gain factor of oscillator $$f_{det}=k*C_{det} \qquad \text{Equation 6}$$

Where:

$f_{det}$=Frequency associated with reference sensor $C_{det}$=Capacitance of detection sensor k=Gain factor of oscillator The next stage of the measurement circuitry 40 is a mixer 74. The mixer 74, or mixer circuit, operates on the transfer function shown in Equation 7 below:

$$f_{mix}=(f_1+f_2)+(f_1-f_2) \qquad \text{Equation 7}$$

Where:

$f_{mix}$=Output of mixer $f_1$=First input frequency $f_2$=Second input frequency The first input of the mixer 74, $f_1$, is the output of the reference oscillator 73, $f_{ref}$. The second input of the mixer 74, $f_2$, is the output of the detection oscillator 72, $f_{det}$. Substituting terms in Equation 4 with those of Equation 3 yields Equation 8:

$$f_{mix}=f_{ref}+(f_{ref}+f_{det})+(f_{ref}-(f_{ref}+f_{det}) \qquad \text{Equation 8}$$

Equation 8 simplifies to Equation 9:

$$f_{mix}=(2f_{ref}+f_{det})+f_{det} \qquad \text{Equation 9}$$

The output of the mixer 74 passes through a low pass filter 75 whose corner frequency is selected slightly above the maximum value of $f_{det}$. This will eliminate the $(2f_{ref}+f_{det})$ term. The frequency contributions from the respective ambient environmental conditions for both sensors 36, 38 are subtracted off after they pass through the low pass filter 75.

Therefore, $f_{det}$ may only be composed of contributions from hydraulic fluid such that an analog output to the e.g., warning system represents the presence of leakage fluid on the fluid detection sensor 36.

The output of the low pass filter 75 is then capacitively coupled to a Schmitt triggered zero cross detector 76 to convert the $f_{det}$ sinusoidal signal to a square wave.

The output of the Schmitt triggered zero cross detector 76, $f_{det}$, is then presented to the final stage of the circuit, which may be a Bias T 77 operatively coupled to a voltage source, such as an AC or DC source (e.g., 5 vDC in the illustrated embodiment). The Bias T 77 is a diplexer that enables an external source to provide DC power to the sensors 36, 38 via the measurement circuitry 40, while simultaneously enabling transmission of the output signal derived from the sensors to be output via the measurement circuitry 40.

The output from the Bias T 77 is then output from the measurement circuitry 40 via a communications circuit, such as via communications connector 62. In the illustrated embodiment, the communications circuit includes an HD BNC coaxial connector for operatively connecting the measurement circuitry 40 to receiver circuitry 52.

The receiver circuitry 52 also may be operatively coupled to a communications circuit, such as a communications connector 78, for example a corresponding HD BNC coaxial connector, for coupling to the measurement circuitry 40 via connector 62 and receiving the output from the measurement circuitry 40. In the illustrated embodiment, the receiver circuitry 52 includes a Schmitt triggered zero cross detector 79 and frequency to voltage converter circuitry 80. The output 81 of the converter 80 is an analog signal that represents the detection of fluid by the fluid detection sensor 36, if any, which can be communicated to an electrical or electronic device for indicating such detection of fluid. As noted above, such information may be conveyed to one or more indicators, computers, or electronic systems by any of several industry standard analog output signal such as current or voltage. This may include communication to an aircraft electronic warning system which may include a prognostic health monitoring system of the pump, for example. The aircraft warning system may provide an indication to a user, such as a pilot, air traffic controller, maintenance personnel, or the like.

Although an exemplary form of the measurement circuitry 40 and receiver circuitry 52 has been shown and described, it is understood by those having ordinary skill in the art that other suitable forms of the circuitry 40, 52 may be employed. For example, the sub-circuits or modules of the circuitry 40 and 52 may be combined in any suitable manner, and in some embodiments certain sub-circuits or modules may be substituted for other types of circuit or modules, or may be eliminated altogether. In the illustrated embodiment, the measurement circuitry 40 is onboard the fluid conduit 32 (e.g., fitting) such as within the casing recess 54, or other suitable cavity, and is operatively coupled to the receiver circuitry 52 via the communications connectors 62, 78. In exemplary embodiments, the measurement circuitry 40 and sensors 36, 38 in the illustrated embodiment may be powered through the receiver circuitry 52 and communicate information through the disconnectable receiver circuitry 52. It is understood, however, that onboard power and/or onboard receiver circuitry also may be employed. For example, the measurement circuitry 40 and/or receiver circuitry 52 may include wireless communication circuitry for communicating the signal(s) derived from the sensors 36, 38. Alternatively or additionally, onboard data storage, such as a non-transitory computer readable medium (e.g., solid state drive) may be provided for storing the information derived from the sensor(s) 36, 38 for later download.

Figure 13:
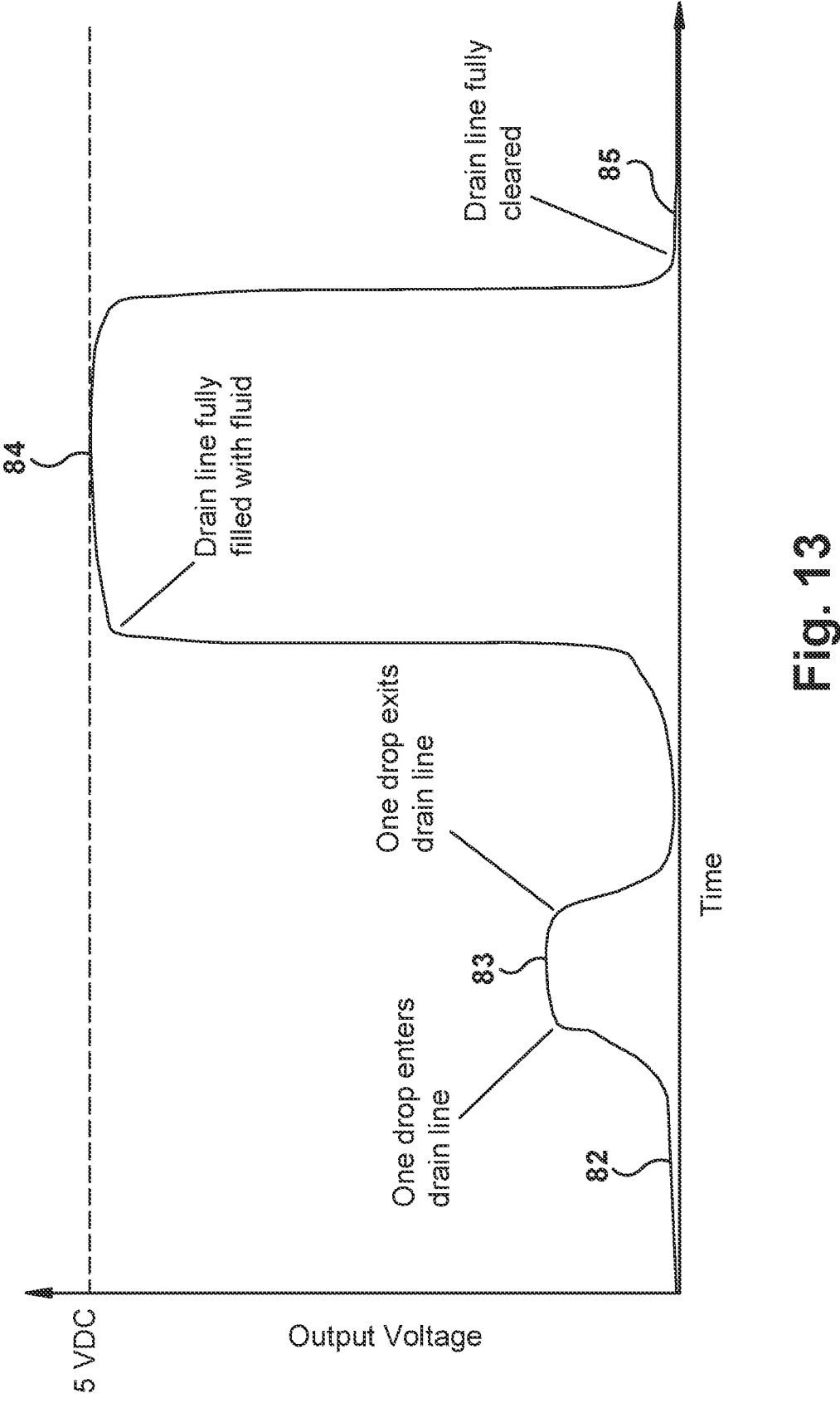
FIG. 13 is an example diagram illustrating an output voltage signal over time as the fluid detection system detects fluid.
Figure 14:
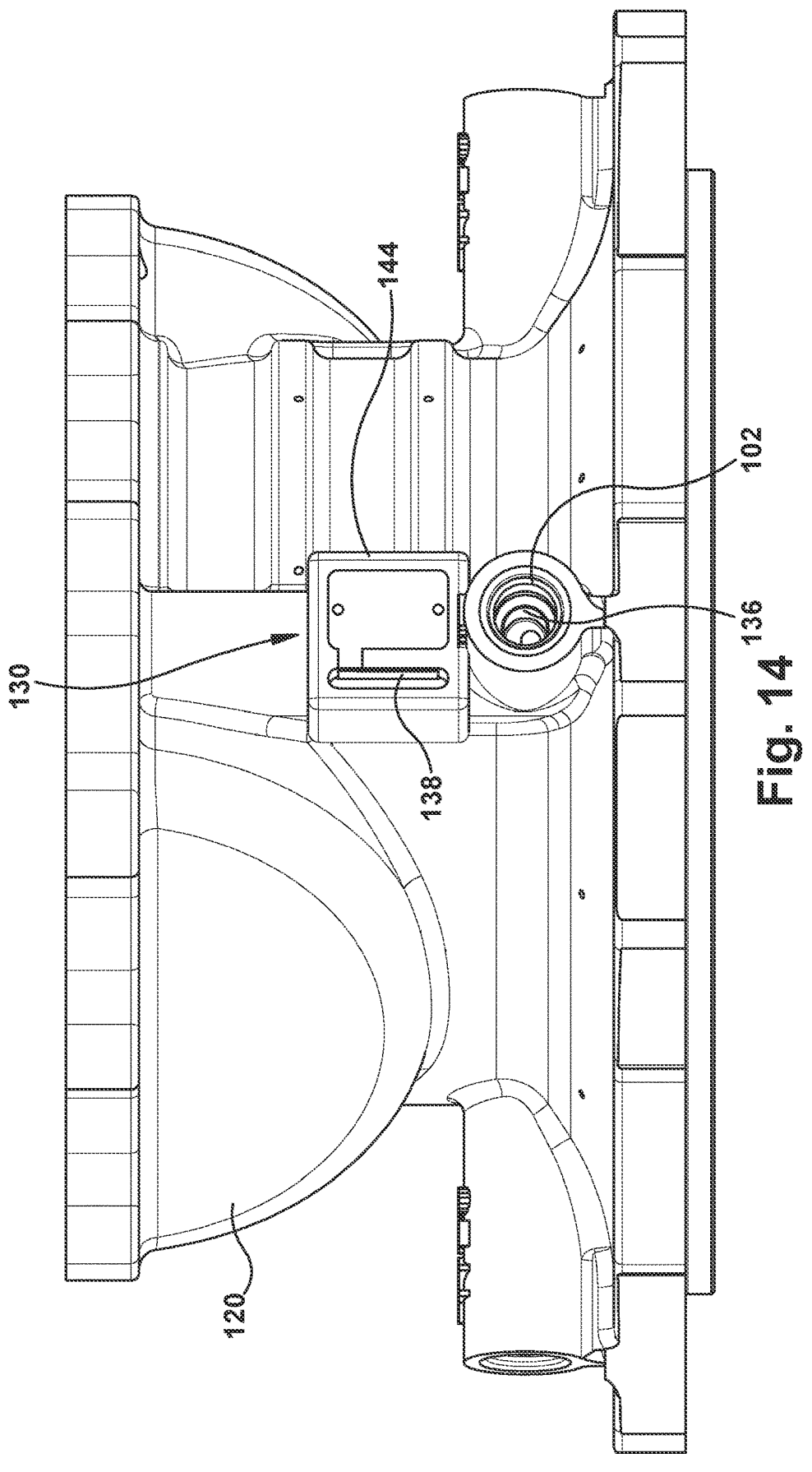
FIG. 14 is a front side view of another exemplary fluid detection system with a portion of an exemplary fluid device according to another embodiment of the present disclosure.
Figures 15, 16:
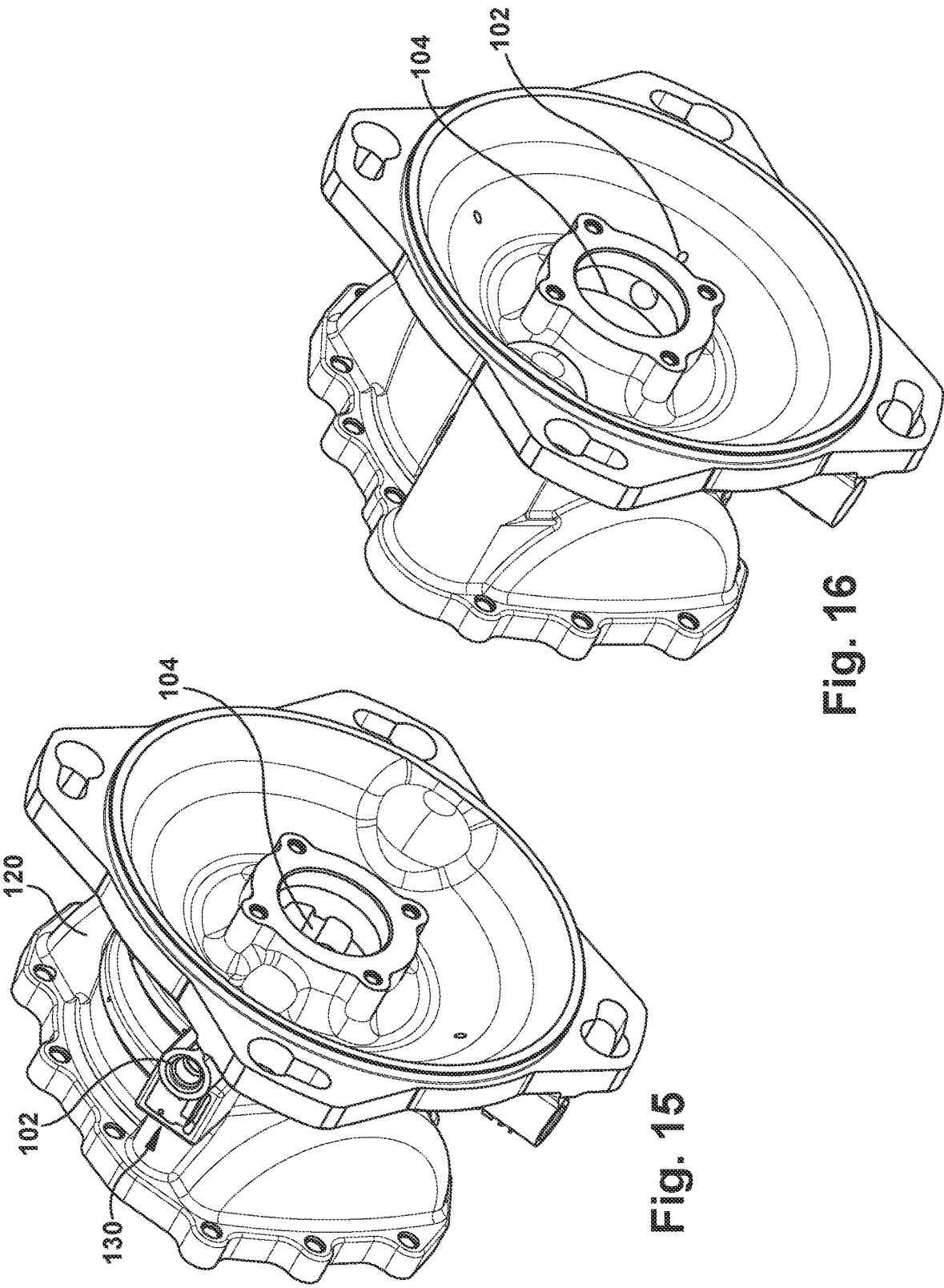
FIG. 15 is a perspective front view of the fluid detection system and fluid device in FIG. 14.
FIG. 16 is a perspective rear view of the fluid device in FIG. 14.
Figure 17:
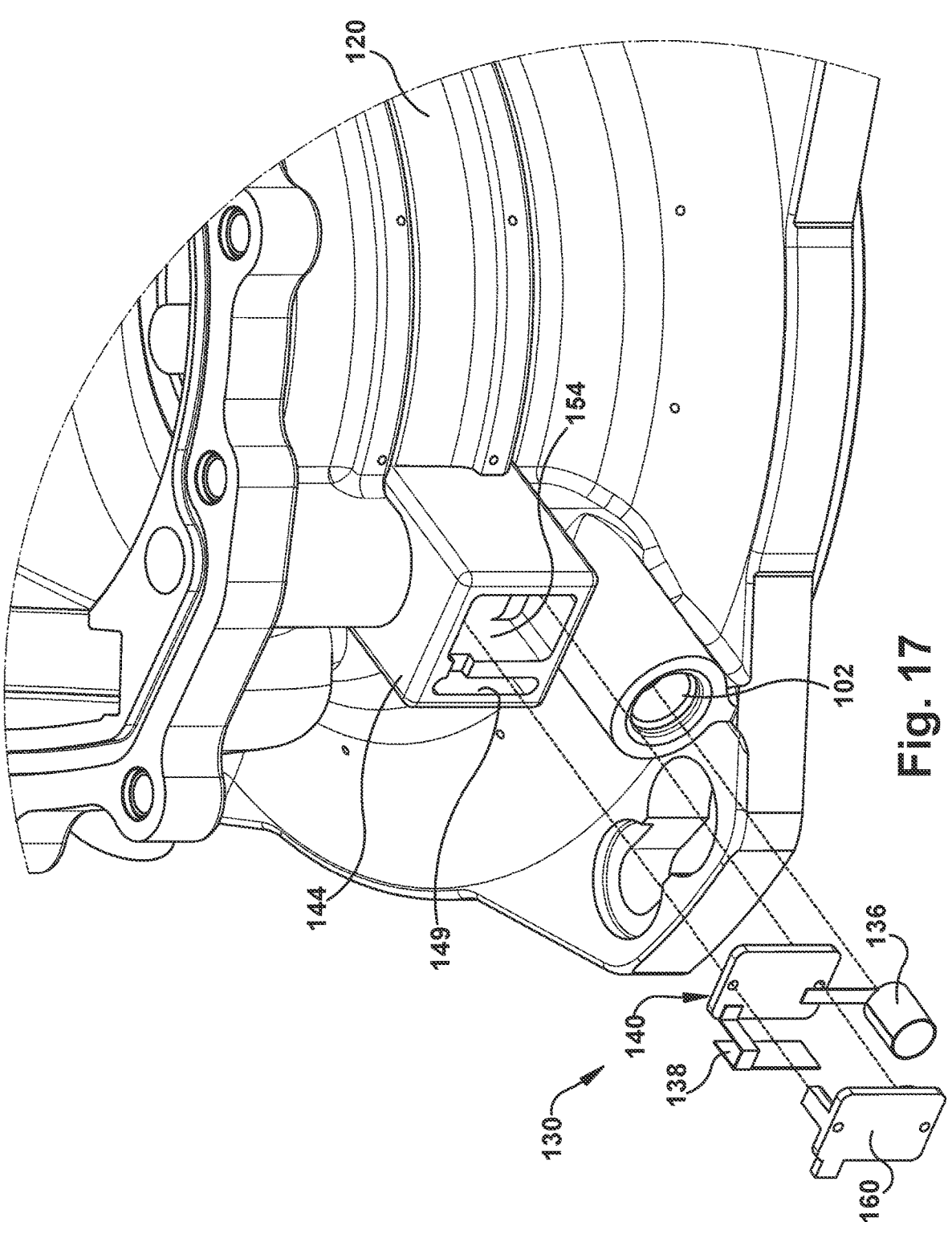
FIG. 17 is an exploded front perspective view of the fluid detection system with the fluid device in FIG. 14.

FIG. 13 shows an example diagram illustrating an output voltage signal over time as the fluid detection system 30 detects drops of fluid. Generally, the greater the amount of fluid at the sensing area 46 of the fluid detection sensor 36, the higher the output voltage indicated. As shown at 82, for example, with no fluid on the detection sensor, the output voltage is at or near 0 Vdc. As one drop of leakage fluid passes across the fluid detection sensor 36, the output voltage increases, such as to 1 Vdc, as shown at 83. Such a small amount of fluid may not reach a threshold value, and thus no indication may be made to an aircraft warning system, for example; or the aircraft warning system may not indicate a warning based upon such a relatively small signal. However, the signal may be quantified as one drop and conveyed to a system for counting fluid drops. Cumulative or integrated fluid drops may exceed a threshold value and thus the aircraft warning system may indicate a warning. The threshold value may be a cumulative total number of drops, or a leakage rate measured in drops/minute, for example. When the fluid conduit is filled with fluid, as shown at 84, then the output voltage further increases to reach or exceed a threshold limit, which is set at 5 Vdc in the illustrated example. In such a scenario, the signal may be communicated to the aircraft warning system, for example; or the aircraft warning system may indicate a warning. As shown at 85, the fluid at the detection sensor within the conduit 34 has fully cleared and the output voltage reduces to or near zero.

Turning to FIGS. 14-17, another exemplary embodiment of a fluid detection system 130 for a fluid device is shown. In the illustrated embodiment, the fluid detection system 130 is integrated into a permanent structure of the fluid device instead of being integrated into a removable component, such as the fluid conduit 32 or fitting, that couples to the fluid device. The fluid device in the illustrated embodiment is the same as or substantially similar to the hydraulic pump 10 shown in FIG. 1, in which the fluid detection system 130 is integrated into an exemplary mounting flange 120 of the pump 10. For the sake of simplicity, only the mounting flange 120 of the pump 10 is shown in FIGS. 14-17.

The description below for the fluid detection system 130 is substantially the same as, or substantially similar to, the above-referenced fluid detection system 30, and consequently the same reference numerals but indexed by 100 are used to denote structures corresponding to the same or similar structures in the fluid detection systems 30, 130. In addition, the foregoing description of the fluid detection system 30 is equally applicable to the fluid detection system 130, except as noted below. Moreover, aspects of the fluid detection systems 30 and 130 may be substituted for one another or used in conjunction with one another where applicable.

As shown in the illustrated embodiment, the pump mounting flange 120 includes one or more fluid passages 102 for conveying leakage fluid from the mounting flange 120. The mounting flange 120 forms a chamber that surrounds a shaft seal 104 where leakage of fluid generally is more likely to occur in the pump. The fluid passage(s) 102 of the mounting flange 120 include inlets that open into the chamber, and include outlets opening outwardly of the mounting flange 120 for connection to a fluid conduit, plug, or the like. The fluid passage(s) 102 may be considered permanent fluid conduit portion(s) of the device.

In the illustrated embodiment, the detection sensor 136 of the fluid detection system 130 is disposed within the fluid passage 102 of the mounting flange 120, which is a leak path of the device pump. Such a leak path is not intended for fluid flow during normal operation of the device, but rather is used to capture or drain fluid during non-ideal, or non-nominal conditions of leakage which inevitably may occur over the service life of the device. The detection sensor 136 and measurement circuitry 140 to which the detection sensor 136 is operatively connected may be the same as those components described above. Accordingly, in the illustrated embodiment, the detection sensor 136 is a flexible capacitive circuit board that is rolled and attached to an internal surface of the fluid passage 102 with a suitable adhesive, such as epoxy, with the sensing area of the detection sensor 136 facing toward a center of the passage 102 for detection of fluid.

As shown, the reference sensor 138 and the measurement circuitry 140 may be contained within a circuit housing 144 or casing that is integrated into the housing or body of the mounting flange 120 outside of the fluid flow (leak) path. The circuit housing 144 may be attached to, or formed unitary with, the body of the mounting flange 120. The circuit housing 144 includes a cavity 154 for containing the measurement circuitry 140, which may be potted within the cavity with a suitable potting (e.g., epoxy). The circuit housing 144 includes a cover 160 for encasing the measurement circuitry 140 within the cavity. A passage (hidden from view) is provided between the detection sensor 136 and the measurement circuitry 140 for enabling the electrical connector portion of the detection sensor 136 (e.g. metal tab or wires) to connect to the measurement circuitry 140.

In the illustrated embodiment, the reference sensor 138 is contained within an open cavity 149 of the sensor housing 144. The position of the reference sensor 138 within the cavity 149 is unlikely and/or purposefully restricted from exposure to fluid. The reference sensor 138 may be the same as the reference sensor 38 described above. Accordingly, in the illustrated embodiment, the reference sensor 138 is a flexible capacitive circuit board that is attached to a surface within the open cavity 149 with a suitable adhesive. The sensing portion of the reference sensor 138 faces outwardly for exposure to the environmental condition at this reference location. An electrical connector portion of the reference sensor 138 is coupled to the measurement circuitry 140, such as via a passage between the open cavity 149 containing the reference sensor 138 and the enclosed cavity 154 containing the measurement circuitry 140.

As described above in connection with measurement circuitry 40, the measurement circuitry 140 (which includes one or more suitable circuits and/or signal conditioning electronics, as described above) generally receives the electrical outputs from the respective sensors 136 and 138, makes a differential measurement of the electrical outputs, and outputs this information, such as in the form of a current or signal, for a determination or indication of whether fluid has been detected at the detection sensor 136. Communication of the information derived from the sensors 136, 138 may be made via a suitable communications circuit (e.g., wired communications connector or port), or may be wireless, or may be stored locally on a hard drive for later download, as described above and/or as would be understood by those having ordinary skill in the art.

Exemplary fluid detection systems 30 and 130 have been described herein, such as for leak detection of a fluid device. The fluid detection system(s) generally include a fluid detection sensor disposed at a fluid sensing portion of the system, and a reference sensor disposed at a reference sensing portion of the system. The fluid detection sensor and the reference sensor are subject to at least one common ambient environmental condition, such that the fluid detection sensor exhibits an electrical characteristic that is different from an electrical characteristic of the reference sensor when fluid contacts the fluid detection sensor. The fluid sensing portion may be within an internal fluid passage of a conduit that is removably couplable to the fluid device. Alternatively or additionally, the fluid sensing portion may be disposed in a fluid flow path, such as a leak path, in a permanent structure of the device. The reference sensor may be disposed in a location away from and/or intentionally divided from the fluid (e.g., leakage) flow path.

While exemplary forms of a fluid detection system 30 and 130 have been described above, it should be apparent to those having ordinary skill in the art that alternative configurations also could be employed. For example, although shown and described as being integrated into a removably couplable conduit 32, the fluid detection system 30, 130 could be employed on any suitable fitting, such as a plug in which the detection sensor is in the port of the device. Moreover, although shown and described as being integrated into an exemplary mounting flange 20, 120 of a pump 10, the fluid detection system 30, 130 could be employed on any permanent structure of a fluid device, particularly in a leak path of such a device that would indicate faulty operation. The permanent structure of the device may be a permanent structural portion of the device through which fluid (e.g., leakage) flows, such as a housing, casing, body of the device, manifold, mounting flange, or a flow passage, chamber, cavity, or the like. The fluid device may be any suitable device that conveys fluid, in particular liquids, such as a pump (e.g., hydraulic pump, fuel pump, lubrication pump, etc.), valve, motor, actuator, or other fluid-operated consumer, or the like. The fluid device may be an aircraft component, in which routine maintenance and inspection typically is performed. In an aircraft system, for example, the fluid device may be a lubrication and scavenge pump that provides oil flow to the gearbox and main shaft bearings; or the fluid device may be a hydraulic pump that provides hydraulic fluid to fluid-operated consumers, such as hydraulic motors or actuators that operate components, such as flaps, landing, steering, or the like; or the fluid device may be a fluid-operated consumer; or the fluid device may be a fuel pump that delivers fuel to the turbine engine. The fluid sensing technology also could be used not only for leak detection, but also for determining proper operation of a device by placing the detection sensor in a normal operating flow path of the device. This could be any fluid-operated consumer, such as a pump, motor, actuator, or the like. In such device(s), the normal operating flow path may be in a fluid body of the system that communicates flow, for example a flow path or passage through the body between input and output ports of the body, for example. In such a device using the fluid detection system for detecting fluid during normal operations, and the absence of fluid in abnormal operations, the exemplary process of detection described above essentially is reversed, in that, the difference in capacitance between reference and detection sensor is the normal state, and when the capacitances approach each other or are equal to each other an indication of abnormal condition may occur. Alternatively or additionally, such fluid sensing technology could be used to detect the presence of fluid, such as grease or other lubricant in a sealed bearing, ball/socket joint, gear train, ball-screw, or the like. Similarly to the foregoing scenario, in a normal operating state the fluid/lubricant is present, so any diminished signal (e.g., below a threshold value) would indicate loss of the fluid/lubricant and required maintenance. Other possible applications include detecting fluid leakage past dynamic seals on a bootstrap reservoir, or detecting fluid leakage past dynamic seals on an actuator, as would be understood by those having ordinary skill in the art in view of the disclosure herein.

According to an aspect, a fluid detection system comprising: a fluid conduit having an internal portion and an external portion; a detection sensor disposed at the internal portion; a reference sensor disposed at the external portion; wherein the detection sensor and reference sensor are subject at least one common ambient environmental condition, such that the detection sensor exhibits an electrical characteristic that is different from an electrical characteristic of the reference sensor when fluid contacts the detection sensor.

Embodiment(s) of the foregoing aspect, or any other aspect described herein, may include one or more of the following additional features, separately or in any combination; and such aspect(s) and/or embodiment(s) may be combined with any other aspect(s) and/or embodiment(s) described herein in any suitable manner.

In some embodiments, the detection sensor comprises a first circuit board.

In some embodiments, the first circuit board is a flexible circuit board.

In some embodiments, the first circuit board is a rigid circuit board.

In some embodiments, the reference sensor comprises a second circuit board.

In some embodiments, the second circuit board is a flexible circuit board.

In some embodiments, the second circuit board is a rigid circuit board.

In some embodiments, the first flexible circuit board of the detection sensor is rolled into a cylinder with a sensing portion facing inwardly of a fluid passage at least partially formed by the internal portion, and with a back portion attached to the internal portion of the conduit.

In some embodiments, a length of the detection sensor is equal to a circumference of a diameter of the internal portion of the fluid conduit.

In some embodiments, the second circuit board is attached to the external portion of the conduit.

In some embodiments, the first circuit board (e.g., flexible or rigid) comprises a polyimide film.

In some embodiments, the second circuit board (e.g., flexible or rigid) comprises a polyimide film.

In some embodiments, an upper layer of the detection sensor includes a detection sensor sensing area.

In some embodiments, an upper layer of the reference sensor includes a reference sensor sensing area.

In some embodiments, the detection sensor sensing area includes a series of circuit traces that produce a detection capacitor.

In some embodiments, the reference sensor sensing area includes a series of circuit traces that produce a reference capacitor.

In some embodiments, the detection capacitor includes electrodes that are comprised of a first array of parallel interleaving traces.

In some embodiments, the reference capacitor includes electrodes that are comprised of a second array of parallel interleaving traces.

In some embodiments, a lower layer of the detection sensor comprises a shield that prevents external interference from influencing the detection sensor sensing area from a back of the detection sensor.

In some embodiments, a lower layer of the reference sensor comprises a shield that prevents external interference from influencing the reference sensor sensing area from a back of the reference sensor.

In some embodiments, the fluid detection system according to any described herein is in combination with measurement circuitry that converts capacitance from each of the reference sensor and the detection sensor into frequency values that can be quantified to represent the presence of fluid at the detection sensor.

In some embodiments, the measurement circuitry comprises a mixer that mixes respective output frequencies, and a low pass filter that filters output frequencies from the mixer that corresponds to the at least one common ambient environmental condition, thereby leaving frequencies that correspond to the presence of hydraulic fluid at the detection sensor.

According to another aspect, an aircraft system includes: a fluid circuit; a fluid device in the fluid circuit configured to convey or receive fluid for performing an aircraft function; and the fluid detection system according to any described herein, wherein the fluid conduit is a permanent structural portion of the fluid device, or wherein the fluid conduit is a part of a fluid fitting that is removably couplable to the fluid device.

According to another aspect, an aircraft includes: the aircraft system according to the foregoing, wherein the fluid detection system is arranged with the detection sensor disposed in a leak path of the fluid device; and an aircraft warning system or prognostic system for the fluid device, in which the warning system or prognostic system operatively receives information from the fluid detection system for indicating fluid leakage of the fluid device when fluid is detected at the detection sensor.

According to another aspect, a fluid device that performs a fluid-operated function, includes: a body portion that forms a flow path through which fluid flows during normal operating conditions of the device; a leak path relative to the body portion in which leakage fluid flows outside of the flow path; a leak detection system comprising: a fluid detection sensor disposed in the leak path; a reference sensor disposed at a reference location relative to the fluid detection sensor; and circuitry configured to: receive respective electrical outputs from the detection sensor and the reference sensor; measure and/or compare the respective electrical outputs, and communicate information derived from the measurement and/or comparison of the respective electrical outputs to indicate when leakage fluid is detected at the fluid detection sensor.

Embodiment(s) of the foregoing aspect, or any other aspect described herein, may include one or more of the following additional features, separately or in any combination; and such aspect(s) and/or embodiment(s) may be combined with any other aspect(s) and/or embodiment(s) described herein in any suitable manner.

In some embodiments, the fluid detection sensor and the reference sensor are subject to at least one common ambient environmental, such that the fluid detection sensor exhibits an electrical characteristic that is different from an electrical characteristic of the reference sensor when fluid contacts the fluid detection sensor.

In some embodiments, the body portion includes at least part of a housing, a casing, a manifold, a mounting flange, or a surface that forms at least part of a flow passage, a fluid chamber, or a fluid cavity of the device.

In some embodiments, the fluid device is a pump, a valve, a hydraulic motor, or an actuator.

In some embodiments, the fluid device is an aircraft device that is configured to enable an aircraft-related function.

According to another aspect, a capacitive fluid detection sensor, includes: a polymer base layer; a plurality of electrically conductive traces overlying the polymer base layer; and a ground layer underlying the polymer base layer; wherein the plurality of electrically conducive traces includes a first set of traces extending parallel to each other and being laterally spaced apart, and a second set of traces extending parallel to each other and to the first set of traces, the second set of traces being interlaced among the first set of traces, and the second set of traces being electrically coupled to the ground layer via respective electrically conductive interconnects, and wherein the plurality of electrically conductive traces form a capacitive sensing portion of the capacitive fluid detection sensor.

Embodiment(s) of the foregoing aspect, or any other aspect described herein, may include one or more of the following additional features, separately or in any combination; and such aspect(s) and/or embodiment(s) may be combined with any other aspect(s) and/or embodiment(s) described herein in any suitable manner.

In some embodiments, the polymer base layer is a flexible polyimide film.

In some embodiments, the ground layer is formed as a metal grid or lattice.

In some embodiments, the detection sensor further comprising a first polyimide coverlay that overlies the plurality of electrically conductive traces.

In some embodiments, a second polyimide coverlay underlies the ground layer.

According to another aspect, a method of leakage detection and warning in an aircraft includes: providing a fluid detection system in a leak path of a fluid device of the aircraft, the fluid detection system including a fluid detection sensor disposed in the leak path, and a reference sensor disposed at a reference sensing portion outside of the leak path; receiving electrical outputs from the fluid detection sensor and the reference sensor; comparing the electrical outputs to determine the presence of leakage fluid at the fluid detection sensor; and outputting information corresponding to the detection of the leakage fluid at the fluid detection sensor to a warning system for providing an alert.

According to another aspect, a fluid-dependent device, includes: a fluid body having a fluid flow path or fluid passage for providing a fluid function of the device, and a leak detection system comprising: a fluid detection sensor disposed in the fluid flow path; a reference sensor disposed at a reference location outside of the fluid flow path; and circuitry configured to: receive respective electrical outputs from the detection sensor and the reference sensor; measure and/or compare the respective electrical outputs, and communicate information derived from the measurement and/or comparison of the respective electrical outputs to indicate when operating fluid at the fluid detection sensor has diminished, such as below a threshold level.

Embodiment(s) of the foregoing aspect may include one or more of the following additional features, separately or in any combination.

In some embodiments, the fluid-dependent device is a fluid-operated device, such as a fluid-operated consumer (e.g., hydraulic motor, pump, actuator or the like) in which the fluid body has an inlet, an outlet, and the fluid flow path or passage is between the inlet and outlet for providing flow of the operating fluid for performing the fluid-operated function of the device.

In some embodiments, the fluid-dependent device is a sealed bearing, ball/socket joint, gear train, ball-screw, or the like, in which the fluid flow path is between bearing elements and the detection sensor is in fluid communication therewith.

In some embodiments, the fluid-dependent device is a dynamic seal on a bootstrap reservoir or a dynamic seal on an actuator.

In some embodiments, comparison of the respective electrical outputs to indicate when operating fluid at the fluid detection sensor has diminished, such as below a threshold level, includes the detection sensor having a different electrical characteristic (e.g., capacitance) than the reference sensor during a normal operating state of the device, indicating presence of fluid at the detection sensor and proper operation, and when the electrical characteristics (e.g., capacitances) of the detection and reference sensors approach each other (e.g., within a threshold value) or are equal to each other, then this is an indication of an abnormal condition of the fluid device.

As used herein, an "operative" connection or coupling, or a connection by which entities are "operatively" connected, is one in which the entities are connected in such a way that the entities may perform as intended. An operative connection may be a direct connection or an indirect connection in which an intermediate entity or entities cooperate or otherwise are part of the connection or are in between the operably connected entities. An operative connection or coupling may include the entities being integral and unitary with each other. An "operative" connection also is one in which signals, physical communications, or logical communications may be sent or received. Typically, an operative connection includes a physical interface, an electrical interface, or a data interface, but it is to be noted that an operable connection may include differing combinations of these or other types of connections sufficient to allow operable control. For example, two entities can be operatively connected by being able to communicate signals to each other directly or through one or more intermediate entities like a circuit, processor, operating system, a logic, software, or other entity. Logical or physical communication channels can be used to create an operative connection.

It is understood that embodiments of the subject matter described in this disclosure can be implemented in combination with digital electronic circuitry, controllers, processors, computer software, firmware, and/or hardware. For example, embodiments may be implemented in a fluid detection system that uses one or more modules of computer program with instructions encoded on a non-transitory computer-readable medium for execution by, or to control the operation of, data processing apparatus. The operations may include physical manipulations of physical quantities. Usually, though not necessarily, the physical quantities take the form of electrical or magnetic signals capable of being stored, transferred, combined, compared, and otherwise manipulated in a logic and the like.

It will be appreciated that the processes may be implemented using various programming approaches like machine language, procedural, object oriented or artificial intelligence techniques. In one example, methodologies are implemented as processor executable instructions or operations provided on a computer-readable medium. Thus, in one example, a computer-readable medium may store processor executable instructions operable to perform a method. The computer-readable medium may be a hard-drive, a machine-readable storage device, a memory device, or a combination of one or more of the foregoing. The controller may include all apparatus, devices, and machines for processing data, including by way of example a programmable processor, a computer, or multiple processors or computers.

The controller may include, in addition to hardware, code that creates an execution environment for the computer program in question. The computer program (also referred to as software or code), may be deployed in any form, including as a stand-alone program or as a module, component, subroutine, or other unit suitable for use in a computing environment. The computer program may be deployed to be executed on one computer or on multiple computers that are located at one site or distributed across multiple sites and interconnected by a communication network. The processor may include all apparatus, devices, and machines suitable for the execution of a computer program, which may include, by way of example, both general and special purpose microprocessors, and any one or more processors of any kind of digital computer. Generally, the processor will receive instructions and data from a read-only memory or a random-access memory or both. The computer may include, or be operatively coupled to receive data from or transfer data to, or both, one or more mass storage devices for storing data. Devices suitable for storing computer program instructions and data include all forms of non-volatile memory, media and memory devices, including by way of example semiconductor memory devices. The processor and the memory can be supplemented by, or incorporated in, special purpose logic circuitry.

It is to be understood that terms such as "top," "bottom," "upper," "lower," "left," "right," "front," "rear," "forward," "rearward," and the like as used herein may refer to an arbitrary frame of reference, rather than to the ordinary gravitational frame of reference.

As used herein, the phrase "and/or" should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

Although the invention has been shown and described with respect to a certain embodiment or embodiments, it is obvious that equivalent alterations and modifications will occur to others skilled in the art upon the reading and understanding of this specification and the annexed drawings. In particular regard to the various functions performed by the above described elements (components, assemblies, devices, compositions, etc.), the terms (including a reference to a "means") used to describe such elements are intended to correspond, unless otherwise indicated, to any element which performs the specified function of the described element (i.e., that is functionally equivalent), even though not structurally equivalent to the disclosed structure which performs the function in the herein illustrated exemplary embodiment or embodiments of the invention. In addition, while a particular feature of the invention may have been described above with respect to only one or more of several illustrated embodiments, such feature may be combined with one or more other features of the other embodiments, as may be desired and advantageous for any given or particular application.

What is claimed is:

1. A fluid detection system comprising:
   a fluid conduit having an internal portion and an external portion;
   a detection sensor disposed at the internal portion;
   a reference sensor disposed at the external portion;
   wherein the detection sensor and reference sensor are subject at least one common ambient environmental condition, such that the detection sensor exhibits an electrical characteristic that is different from an electrical characteristic of the reference sensor when fluid contacts the detection sensor.

2. The fluid detection system according to claim 1,
   wherein the detection sensor comprises a first flexible circuit board; and
   wherein the reference sensor comprises a second circuit board.

3. The fluid detection system according to claim 2, wherein the second circuit board is attached to the external portion of the conduit.

4. The fluid detection system according to claim 1, wherein an upper layer of the detection sensor includes a detection sensor sensing area, and an upper layer of the reference sensor includes a reference sensor sensing area.

5. The fluid detection system according to claim 4, wherein the detection sensor sensing area includes a series of circuit traces that produce a detection capacitor, and the reference sensor sensing area includes a series of circuit traces that produce a reference capacitor.

6. The fluid detection system according to claim 5, wherein the detection capacitor includes electrodes that are comprised of a first array of parallel interleaving traces, and wherein the reference capacitor includes electrodes that are comprised of a second array of parallel interleaving traces.

7. The fluid detection system according to claim 4, wherein a lower layer of the detection sensor comprises a shield that prevents external interference from influencing the detection sensor sensing area from a back of the detection sensor, and wherein a lower layer of the reference sensor comprises a shield that prevents external interference from influencing the reference sensor sensing area from a back of the reference sensor.

8. The fluid detection system according to claim 1, in combination with measurement circuitry that converts capacitance from each of the reference sensor and the detection sensor into frequency values that can be quantified to represent the presence of fluid at the detection sensor.

9. The fluid detection system according to claim 8, wherein the measurement circuitry comprises a mixer that mixes respective output frequencies, and a low pass filter that filters output frequencies from the mixer that corresponds to the at least one common ambient environmental condition, thereby leaving frequencies that correspond to the presence of hydraulic fluid at the detection sensor.

10. A fluid detection system comprising:

a fluid conduit having an internal portion and an external portion;

a detection sensor disposed at the internal portion;

a reference sensor disposed at the external portion;

wherein the detection sensor and reference sensor are subject at least one common ambient environmental condition, such that the detection sensor exhibits an electrical characteristic that is different from an electrical characteristic of the reference sensor when fluid contacts the detection sensor;

wherein the detection sensor comprises a first flexible circuit board;

wherein the reference sensor comprises a second circuit board; and wherein the first flexible circuit board of the detection sensor is rolled into a cylinder with a sensing portion facing inwardly of a fluid passage at least partially formed by the internal portion, and with a back portion attached to the internal portion of the conduit.

11. The fluid detection system of claim 10, wherein a length of the detection sensor is equal to a circumference of a diameter of the internal portion of the fluid conduit.

12. A fluid detection system comprising:

a fluid conduit having an internal portion and an external portion;

a detection sensor disposed at the internal portion;

a reference sensor disposed at the external portion;

wherein the detection sensor and reference sensor are subject at least one common ambient environmental condition, such that the detection sensor exhibits an electrical characteristic that is different from an electrical characteristic of the reference sensor when fluid contacts the detection sensor;

wherein the detection sensor comprises a first flexible circuit board;

wherein the reference sensor comprises a second circuit board; and wherein the first flexible circuit board comprises a polyimide film, and wherein the second circuit board comprises a polyimide film.

\* \* \* \* \*